United States Patent
Guo et al.

(10) Patent No.: US 11,452,053 B2
(45) Date of Patent: Sep. 20, 2022

(54) SIGNAL SENDING METHOD, SIGNAL RECEIVING METHOD, AND DEVICE

(71) Applicant: Huawei Technologies Co., Ltd., Shenzhen (CN)

(72) Inventors: Zhiheng Guo, Beijing (CN); Xinqian Xie, Beijing (CN); Qian Wu, Beijing (CN); Yongqiang Fei, Beijing (CN); Wenping Bi, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 16/903,936

(22) Filed: Jun. 17, 2020

(65) Prior Publication Data
US 2020/0322905 A1  Oct. 8, 2020

Related U.S. Application Data

(63) Continuation of application No. PCT/CN2018/121593, filed on Dec. 17, 2018.

(30) Foreign Application Priority Data

Dec. 18, 2017  (CN) .......................... 201711366520.4
Jan. 12, 2018  (CN) .......................... 201810032355.7

(51) Int. Cl.
*H04W 56/00*  (2009.01)
*H04L 1/00*  (2006.01)
(Continued)

(52) U.S. Cl.
CPC ......... *H04W 56/001* (2013.01); *H04L 1/0061* (2013.01); *H04W 72/005* (2013.01); *H04W 72/0453* (2013.01)

(58) Field of Classification Search
CPC ... H04L 1/0061; H04L 5/0064; H04L 5/0053; H04L 27/26; H04L 5/0007;
(Continued)

(56) References Cited

U.S. PATENT DOCUMENTS

2009/0185541 A1  7/2009  Tanno et al.
2011/0044256 A1  2/2011  Chang et al.
(Continued)

FOREIGN PATENT DOCUMENTS

CN  104823496 A  8/2015
CN  106330334 A  1/2017
(Continued)

OTHER PUBLICATIONS

3rd Generation Partnership Project; Technical Specification Group Radio Access Network; NR; Physical channels and modulation (Release 15); 3GPP TS 38.211 V15.0.0 (Dec. 2017), 73 pages.
(Continued)

*Primary Examiner* — Brian D Nguyen
(74) *Attorney, Agent, or Firm* — Slater Matsil, LLP

(57) ABSTRACT

A signal sending method, a signal receiving method, and a device are disclosed. The signal sending method includes: determining, by a network device, an SSB and indication information, where the indication information is used to indicate that a frequency location of the SSB is one of frequencies in a frequency set, and the frequency set includes a first frequency and a second frequency, or includes a first frequency, a second frequency, and a third frequency; and sending, by the network device, the SSB and the indication information to a terminal device.

20 Claims, 8 Drawing Sheets

(51) Int. Cl.
*H04W 72/00* (2009.01)
*H04W 72/04* (2009.01)

(58) Field of Classification Search
CPC ........... H04W 72/0453; H04W 72/005; H04W 56/00; H04W 56/001
See application file for complete search history.

(56) References Cited

U.S. PATENT DOCUMENTS

| | | | |
|---|---|---|---|
| 2013/0250818 A1* | 9/2013 | Gaal | H04J 11/0069 370/277 |
| 2017/0359791 A1 | 12/2017 | Onggosanusi et al. | |
| 2018/0139084 A1* | 5/2018 | Jung | H04L 27/26025 |
| 2020/0314845 A1* | 10/2020 | Miao | H04L 5/001 |
| 2020/0328873 A1* | 10/2020 | Ly | H04L 7/10 |
| 2020/0404537 A1* | 12/2020 | Harada | H04W 28/06 |
| 2020/0412594 A1* | 12/2020 | Kim | H04L 5/005 |
| 2020/0413359 A1* | 12/2020 | Li | H04L 5/0094 |
| 2021/0075535 A1* | 3/2021 | Zhang | H04J 11/0079 |
| 2021/0084662 A1* | 3/2021 | Zhang | H04W 24/10 |
| 2021/0120511 A1* | 4/2021 | Wang | H04L 5/0051 |
| 2021/0126822 A1* | 4/2021 | Jung | H04J 11/0069 |
| 2021/0203467 A1* | 7/2021 | Guo | H04W 72/0453 |
| 2021/0218613 A1* | 7/2021 | Park | H04W 56/00 |

FOREIGN PATENT DOCUMENTS

| | | | |
|---|---|---|---|
| CN | 106538019 A | 3/2017 | |
| CN | 106792791 A | 5/2017 | |

OTHER PUBLICATIONS

LG Electronics, "NR Synchronization Signal Design", 3GPP TSG RAN WG1 Meeting #87, R1-1611784, Reno, NV, USA, Nov. 14-18, 2016, 10 pages.

Qualcomm Inc., "Synchronization Raster for NR", 3GPP TSG-RAN WG4 RAN#84 Bis, R4-1710175, Dubrovnik, Croatia, Oct. 9-13, 2017, 5 pages.

Nokia, "DL signals and mobility measurements in NR", 3GPP TSG-RAN WG4 Meeting #82, R4-1701808, Athens, Greece, Feb. 13-17, 2017, 10 pages.

Mediatek Inc.,"Discussion on cell detection requirement for NR", 3GPP TSG-RAN WG4 Meeting #85, R4-1712400, Reno, NV, USA, Nov. 27-Dec. 1, 2017, 5 pages.

3rd Generation Partnership Project; Technical Specification Group Radio Access Network; NR; User Equipment (UE) radio transmission and reception; Part 1: Range 1 Standalone (Release 15), 3GPP TS 38.101-1 V1.0.0 (Dec. 2017), 53 pages.

3rd Generation Partnership Project; Technical Specification Group Radio Access Network; NR; Physical layer procedures for control (Release 15), 3GPP TS 38.213 V2.0.0 (Dec. 2017), 56 pages.

Qualcomm IC., "WF on SS Raster", 3GPP TSG-RAN WG4 RAN#85, R4-1714514, Reno, NV, US, Nov. 27-Dec. 1, 2017, 5 pages.

Nokia et al.,"Sync raster structure to support both SCS-based and 100kHz channel raster for FR1 bands", 3GPP TSG-WG RAN4 Meeting #85, R4-1713777, Reno, NV, USA, Nov. 27-Dec. 1, Nov. 27-Dec. 1, 2017, 6 pages.

\* cited by examiner

SIGNAL SENDING METHOD, SIGNAL RECEIVING METHOD, AND DEVICE

CROSS-REFERENCE TO RELATED APPLICATIONS

This application is a continuation of International Application No. PCT/CN2018/121593, filed on Dec. 17, 2018, which claims priority to Chinese Patent Application No. 201711366520.4, filed on Dec. 18, 2017, and Chinese Patent Application No. 201810032355.7, filed on Jan. 12, 2018. All of the aforementioned patent applications are hereby incorporated by reference in their entireties.

TECHNICAL FIELD

This application relates to the field of communications technologies, and in particular, to a signal sending method, a signal receiving method, and a device.

BACKGROUND

In a new radio (NR) technology of a fifth-generation (5G) mobile communications system, a synchronization signal/physical broadcast channel block (SSB) is defined. In time domain, one SSB occupies four consecutive orthogonal frequency division multiplexing (OFDM) symbols. In frequency domain, one SSB occupies 240 consecutive subcarriers, and the 240 subcarriers are numbered, for example, from 0 to 239. The 240 subcarriers belong to 20 resource blocks (RB), and the 20 resource blocks are numbered, for example, from 0 to 19. In each resource block, subcarriers may be numbered, for another example, from 0 to 11.

At present, in a discussion about an NR system in the 3rd Generation Partnership Project (3GPP) standard, a frequency location of one SSB needs to satisfy a synchronous raster rule. In other words, a frequency location of each SSB needs to satisfy the synchronous raster rule. The frequency location of the SSB may be understood as a frequency location of a reference subcarrier in the SSB, and the reference subcarrier is usually a center subcarrier in the SSB, for example, a subcarrier numbered 120 in 240 consecutive subcarriers occupied by the SSB, that is, a subcarrier numbered 0 in a resource block numbered 10. The current rule is that a frequency of an SSB is equal to (N×900 KHz+M×5 KHz), where N is a positive integer, M is −1, 0, or 1, and the frequencies or locations corresponding to the frequencies may be referred to as a synchronous raster. Before accessing the NR system, a terminal device needs to first search for an SSB broadcasting by a network device, for downlink synchronization. The terminal device usually performs a search at a frequency of the synchronous raster. In addition, in the NR system, a center frequency or a reference frequency of a cell or a carrier needs to satisfy a channel raster rule, and the center frequency or the reference frequency needs to be equal to L×100 KHz, L×15 KHz, or L×60 KHz, where L is a positive integer. Specifically, for a frequency band of 0 GHz to 3 GHz, a frequency at a channel raster location is equal to L×100 KHz, and it may usually be understood as: a channel raster value is equal to 100 KHz. For a frequency band of 3 GHz to 24 GHz, a frequency at a channel raster location is equal to L×15 KHz, that is, a channel raster value is equal to 15 KHz. For a frequency band of 24 GHz to 100 GHz, a frequency at a channel raster location is equal to L×60 KHz, that is, a channel raster value is equal to 60 KHz.

During hardware implementation, precision of determining a frequency by a crystal oscillator of a terminal device is relatively low, and precision of determining a frequency by a crystal oscillator of a network device is relatively high. The terminal device usually readjusts the frequency of the terminal device based on an SSB received from the network device, to obtain a more precise frequency. In the NR system, a frequency of a reference subcarrier in the SSB broadcasting by the network device is, for example, 900 MHz. There may be a relatively large deviation in the frequency determined by the terminal device, for example, 899.995 MHz understood by the terminal device is actually 900 MHz, and in this case, the terminal device can successfully receive, based on the frequency of 899.995 MHz understood by the terminal device, the SSB broadcasting by the network device. Because 899.995 MHz is also a frequency satisfying the synchronous raster rule in the NR system, the terminal device cannot find that there is a deviation between the frequency of the terminal device and the actual frequency. As a result, there is also a frequency deviation in an operating frequency subsequently determined by the terminal device, and performance of communication between the network device and the terminal device may be affected.

SUMMARY

Embodiments of this application provide a signal sending method, a signal receiving method, and a device, so as to improve accuracy of adjusting a frequency offset by a terminal device.

According to a first aspect, a signal sending method is provided. The method may be performed by a network device, and the network device is, for example, a base station. The method includes: determining, by the network device, an SSB and indication information, where the indication information is used to indicate that a frequency location of the SSB is one of frequencies in a frequency set, and the frequency set includes a first frequency and a second frequency, or includes a first frequency, a second frequency, and a third frequency; and sending, by the network device, the SSB and the indication information to the terminal device.

Correspondingly, according to a second aspect, a signal receiving method is provided. The method may be performed by a terminal device. The method includes: receiving, by the terminal device, an SSB and indication information from a network device; and determining, by the terminal device based on the indication information, that a frequency location of the SSB is one of frequencies in a frequency set, where the frequency set includes a first frequency and a second frequency, or includes a first frequency, a second frequency, and a third frequency.

In the embodiments of this application, the network device may send the indication information to the terminal device, where the indication information can indicate the frequency location of the SSB sent by the network device, so that the terminal device can determine the frequency location of the SSB based on the indication information. Therefore, the terminal device can determine a frequency offset between the terminal device and the network device relatively accurately, so as to adjust a frequency of the terminal device, thereby effectively improving accuracy of adjusting the frequency offset by the terminal device, and reducing the frequency offset between the terminal device and the network device.

It should be understood that the frequency location of the SSB may be a location of a reference subcarrier in the SSB. For example, in the prior art, a first subcarrier may be a subcarrier numbered 0 in a resource block numbered 10 in an SSB, namely, a center subcarrier in the SSB. Certainly, the frequency location of the SSB may alternatively be a location of another subcarrier in the SSB. This is not limited herein.

In a possible design, the indication information includes first indication information and second indication information, where the first indication information is used to indicate that the frequency location of the SSB is the first frequency or a fourth frequency, the fourth frequency is the second frequency or the third frequency, and when the first indication information indicates that the frequency location of the SSB is the fourth frequency, the second indication information is used to indicate that the frequency location of the SSB is the second frequency or the third frequency. Correspondingly, when the indication information includes the first indication information and the second indication information, the determining, by the terminal device based on the indication information, that a frequency location of the SSB is one of frequencies in a frequency set includes: determining, by the terminal device based on the first indication information, that the frequency location of the SSB is the first frequency or the fourth frequency, where the fourth frequency is the second frequency or the third frequency; and when the terminal device determines, based on the first indication information, that the frequency location of the SSB is the fourth frequency, determining, by the terminal device based on the second indication information, that the frequency location of the SSB is the second frequency or the third frequency.

In the embodiments of this application, the indication information may give an indication in a level-based indication manner. For example, the indication information includes the first indication information and the second indication information. To be specific, the network device indicates the frequency location of the SSB in the level-based indication manner, and the terminal device can determine the frequency location of the SSB based on the first indication information and the second indication information. If the first indication information is used to indicate that the frequency location of the SSB is the first frequency, the terminal device actually may not need to use the second indication information. However, if the network device does not send the second indication information, a message in which the second indication information is located lacks one field (namely, a field in which the second indication information is located). The terminal device usually performs detection based on a length of the message carrying the field in which the second indication information is located, and if the message lacks one field, the terminal device possibly cannot detect the message. Therefore, in the embodiments, the network device still sends the second indication information to help the terminal device perform detection. However, if the first indication information indicates that the frequency location of the SSB is the first frequency, the terminal device may ignore the second indication information, for example, may not need to parse the second indication information. In this case, the second indication information has no effect. Then, when the first indication information indicates that the frequency location of the SSB is the first frequency, a value of the second indication information may be a random value, or may be set to a default (default) value. This is not limited in the embodiments of this application.

In a possible design, the indication information includes first indication information, where the first indication information is used to indicate that the frequency location of the SSB is the first frequency or a fourth frequency, the fourth frequency is the second frequency or the third frequency, and when the first indication information indicates that the frequency location of the SSB is the fourth frequency, the indication information further includes second indication information, where the second indication information is used to indicate that the frequency location of the SSB is the second frequency or the third frequency. Correspondingly, the determining, by the terminal device based on the indication information, that a frequency location of the SSB is a first frequency, a second frequency, or a third frequency includes: determining, by the terminal device based on the first indication information included in the indication information, that the frequency location of the SSB is the first frequency or the fourth frequency, where the fourth frequency is the second frequency or the third frequency, and when the terminal device determines, based on the first indication information, that the frequency location of the SSB is the first frequency, the indication information includes the first indication information; or when the terminal device determines, based on the first indication information, that the frequency location of the SSB is the fourth frequency, the indication information includes the first indication information and the second indication information, and the terminal device further determines, based on the second indication information, that the frequency location of the SSB is the second frequency or the third frequency.

This is another level-based indication manner. In this manner, if the terminal device needs to use the second indication information, that is, if the first indication information indicates that the frequency location of the SSB is the fourth frequency, the network device may further send the second indication information in addition to the first indication information. In this case, the indication information includes the first indication information and the second indication information. If the terminal device does not need to use the second indication information, that is, if the first indication information indicates that the frequency location of the SSB is the first frequency, the network device may not need to send the second indication information. In this case, the indication information includes only the first indication information. In this manner, transmission resources used can be reduced without affecting determining of the frequency location of the SSB by the terminal device.

In a possible design, the first indication information is a first field in a PBCH in the SSB, and the second indication information is a mask of a CRC in the PBCH; or the first indication information is a first field in the PBCH, and the second indication information is a second field in the PBCH; or the first indication information is a first field in the PBCH, and the second indication information is a fourth field in RMSI.

Several possible implementations of the first indication information and the second indication information are provided, but the embodiments of this application are not limited thereto.

In a possible design, the first field in the PBCH is a field used to indicate an offset between a location of a second subcarrier in the SSB and a location of a third subcarrier in a reference resource block. Correspondingly, the terminal device can determine the offset between the location of the second subcarrier in the SSB and the location of the third subcarrier in the reference resource block based on the first field in the PBCH.

The reference resource block may be understood as any resource block in a common resource grid. A value indicated by the first field may be any one of 0 to 11, or may be any one of 0 to 23. The common resource block grid may be understood as a resource block grid of any downlink signal that is other than the SSB and that is sent by the network device to the terminal device. For example, the downlink signal may be a signal carrying a system message. When the value indicated by the first field is an even number, it implicitly indicates that a raster location of the SSB is the first frequency; or when the value indicated by the first field is an odd number, it implicitly indicates that a raster location of the SSB is the second frequency or the third frequency. Therefore, the network device may indicate the raster location of the SSB by using the first field. It can be learned that in the embodiments of this application, the existing field can directly be used as the indication information, so that not only can the frequency offset between the network device and the terminal device be reduced, but also transmission resources used and parsing complexity of the terminal device can be reduced.

In a possible design, the indication information is used to indicate that a deviation between the frequency location of the SSB and the first frequency is one of deviations in a deviation set, where the deviation set includes 0, a first deviation, and a second deviation. Correspondingly, the determining, by the terminal device based on the indication information, that a frequency location of the SSB is one of frequencies in a frequency set includes: determining, by the terminal device based on the indication information, that the deviation between the frequency location of the SSB and the first frequency is one of the deviations in the deviation set, where the first deviation set includes 0, the first deviation, and the second deviation; and when determining that the deviation between the frequency location of the SSB and the first frequency is 0, determining, by the terminal device, that the frequency location of the SSB is the first frequency; or when determining that the deviation between the frequency location of the SSB and the first frequency is the first deviation, determining, by the terminal device, that the frequency location of the SSB is the second frequency; or when determining that the deviation between the frequency location of the SSB and the first frequency is the second deviation, determining, by the terminal device, that the frequency location of the SSB is the third frequency.

In the embodiments of this application, the indication information may directly indicate that the frequency location of the SSB is one of the frequencies in the frequency set, for example, directly indicate that the frequency location of the SSB is the first frequency, the second frequency, or the third frequency; or may indirectly indicate that the frequency location of the SSB is one of the frequencies in the frequency set, for example, indirectly indicate that the frequency location of the SSB is the first frequency, the second frequency, or the third frequency. In a first example of the indirect indication, the indication information may indicate that the deviation between the frequency location of the SSB and the first frequency is one of the deviations in the deviation set, where the deviation set includes 0, the first deviation, and the second deviation, the first deviation may be understood as a deviation between the first frequency and the second frequency, and the second deviation may be understood as a deviation between the first frequency and the third frequency. Therefore, deviations included in the deviation set are in a one-to-one correspondence with frequencies included in the frequency set, and in this case, indicating a deviation is equivalent to indicating a corresponding frequency. For example, the first deviation is +5 KHz, and the second deviation is −5 KHz. If the indication information indicates that the deviation between the frequency location of the SSB and the first frequency is the first deviation, and the terminal device has known that the first frequency is N×900 KHz, the terminal device can determine, based on the first frequency and the first deviation, that the frequency location of the SSB is (N×900+5) KHz.

Certainly, this is only an example in which the indication information indirectly indicates the frequency location of the SSB. An indication manner used when the indication information indirectly indicates the frequency location of the SSB is not limited in the embodiments of this application.

In a possible design, the first frequency is N×900 kilohertz, the second frequency is (N×900+k) kilohertz, and the third frequency is (N×900−k) kilohertz, where N is a positive integer.

A value of k is obtained according to the following formula: k=M×10, where M is a positive integer. A specific value of k is not limited in the embodiments of this application. For example, k is equal to 5, 10, or 20, or k has another value. In an example, M may not be equal to 10. Using the first frequency as a reference, the second frequency is unnecessarily symmetrical with the third frequency herein. In other words, an absolute value of a difference between the second frequency and the first frequency is unnecessarily equal to an absolute value of a difference between the third frequency and the first frequency. Therefore, the first frequency may be equal to N×900 KHz, the second frequency may be equal to (N×900+k1) KHz, and the third frequency may be equal to (N×900−k2) KHz, where k1 and k2 are not equal. For example, k1 is equal to 5, and k2 is equal to 10. Certainly, k1 and k2 may alternatively be other values.

According to a third aspect, a signal sending method is provided. The method may be performed by a network device, and the network device is, for example, a base station. The method includes: determining, by the network device, an SSB, where a frequency location of the SSB is one of frequencies in a frequency set, the frequency set includes a first frequency and a second frequency, or includes a first frequency, a second frequency, and a third frequency, the first frequency is N×900 kilohertz, the second frequency is (N×900+M×10) kilohertz, and the third frequency is (N×900−M×10) kilohertz, where both N and M are positive integers; and sending, by the network device, the SSB to a terminal device.

Correspondingly, according to a fourth aspect, a signal receiving method is provided. The method may be performed by a terminal device. The method includes: receiving, by the terminal device, an SSB from a network device; and determining, by the terminal device, that a frequency location of the SSB is one of frequencies in a frequency set, where the frequency set includes a first frequency and a second frequency, or includes a first frequency, a second frequency, and a third frequency, the first frequency is N×900 kilohertz, the second frequency is (N×900+M×10) kilohertz, and the third frequency is (N×900−M×10) kilohertz, where both N and M are positive integers.

For example, the first frequency is N×900 KHz, the second frequency is (N×900+k) KHz, and the third frequency is (N×900−k) KHz. If k is equal to 5, when a channel raster value is 100 KHz, some limitations are imposed on a location of a center frequency of a carrier. For example, in a case of the channel raster value of 100 KHz, if a value of the center frequency of the carrier is 700 MHz, when both a subcarrier spacing of the SSB and a subcarrier spacing of a system resource block are 30 KHz, to ensure that a subcarrier in the SSB is aligned with a subcarrier in the system resource block, no available synchronous raster frequency can be found for SSB transmission according to a synchronous raster rule of the SSB, that is, N×900 kilohertz, (N×900+5) kilohertz, and (N×900−5) kilohertz. Therefore, in the embodiments, the raster rule of the SSB is modified into N×900 kilohertz, (N×900+M×10) kilohertz, and (N×900−M×10) kilohertz, that is, k=M×10. In this way, a problem that occurs when k is equal to 5 can be resolved.

In a possible design, the first frequency is N×900 KHz, the second frequency is (N×900+k) kilohertz, and the third frequency is (N×900−k) kilohertz, where k is a multiple of 10 but is not a multiple of 30, and is not 100.

According to a fifth aspect, a network device is provided. The network device has functions of the network device in the foregoing method design. The functions may be implemented by using hardware, or may be implemented by hardware executing corresponding software. The hardware or software includes one or more units corresponding to the foregoing functions.

In a possible design, a structure of the network device may include a processor and a transceiver. The processor and the transceiver may perform corresponding functions in the method provided in the first aspect or any possible design of the first aspect.

According to a sixth aspect, a terminal device is provided. The terminal device has functions of the terminal device in the foregoing method design. The functions may be implemented by using hardware, or may be implemented by hardware executing corresponding software. The hardware or software includes one or more units corresponding to the foregoing functions.

In a possible design, a s structure of the terminal device may include a processor and a transceiver. The processor and the transceiver may perform corresponding functions in the method provided in the second aspect or any possible design of the second aspect.

According to a seventh aspect, a network device is provided. The network device has functions of the network device in the foregoing method design. The functions may be implemented by using hardware, or may be implemented by hardware executing corresponding software. The hardware or software includes one or more units corresponding to the foregoing functions.

In a possible design, a structure of the network device may include a processor and a transceiver. The processor and the transceiver may perform corresponding functions in the method provided in the third aspect or any possible design of the third aspect.

According to an eighth aspect, a terminal device is provided. The terminal device has functions of the terminal device in the foregoing method design. The functions may be implemented by using hardware, or may be implemented by hardware executing corresponding software. The hardware or software includes one or more units corresponding to the foregoing functions.

In a possible design, a structure of the terminal device may include a processor and a transceiver. The processor and the transceiver may perform corresponding functions in the method provided in the fourth aspect or any possible design of the fourth aspect.

According to a ninth aspect, a network device is provided. The network device has functions of the network device in the foregoing method design. The functions may be implemented by using hardware, or may be implemented by hardware executing corresponding software. The hardware or software includes one or more units corresponding to the foregoing functions.

In a possible design, a structure of the network device may include a processing module and a transceiver module. The processing module and the transceiver module may perform corresponding functions in the method provided in the first aspect or any possible design of the first aspect.

According to a tenth aspect, a terminal device is provided. The terminal device has functions of the terminal device in the foregoing method design. The functions may be implemented by using hardware, or may be implemented by hardware executing corresponding software. The hardware or software includes one or more units corresponding to the foregoing functions.

In a possible design, a structure of the terminal device may include a processing module and a transceiver module. The processing module and the transceiver module may perform corresponding functions in the method provided in the second aspect or any possible design of the second aspect.

According to an eleventh aspect, a network device is provided. The network device has functions of the network device in the foregoing method design. The functions may be implemented by using hardware, or may be implemented by hardware executing corresponding software. The hardware or software includes one or more units corresponding to the foregoing functions.

In a possible design, a structure of the network device may include a processing module and a transceiver module. The processing module and the transceiver module may perform corresponding functions in the method provided in the third aspect or any possible design of the third aspect.

According to a twelfth aspect, a terminal device is provided. The terminal device has functions of the terminal device in the foregoing method design. The functions may be implemented by using hardware, or may be implemented by hardware executing corresponding software. The hardware or software includes one or more units corresponding to the foregoing functions.

In a possible design, a structure of the terminal device may include a processing module and a transceiver module. The processing module and the transceiver module may perform corresponding functions in the method provided in the fourth aspect or any possible design of the fourth aspect.

According to a thirteenth aspect, a communications apparatus is provided. The communications apparatus may be the network device in the foregoing method design, or a chip disposed in the network device. The communications apparatus includes a memory, configured to store computer executable program code; and a processor, where the processor is coupled to the memory. The program code stored in the memory includes an instruction, and when the processor executes the instruction, the communications apparatus is enabled to perform the method performed by the network device in the first aspect or any possible design of the first aspect.

According to a fourteenth aspect, a communications apparatus is provided. The communications apparatus may be the terminal device in the foregoing method design, or a chip disposed in the terminal device. The communications apparatus includes a memory, configured to store computer executable program code; and a processor, where the processor is coupled to the memory. The program code stored in the memory includes an instruction, and when the processor executes the instruction, the communications apparatus is enabled to perform the method performed by the terminal device in the second aspect or any possible design of the second aspect.

According to a fifteenth aspect, a communications apparatus is provided. The communications apparatus may be the network device in the foregoing method design, or a chip disposed in the network device. The communications apparatus includes a memory, configured to store computer executable program code; and a processor, where the processor is coupled to the memory. The program code stored in the memory includes an instruction, and when the processor executes the instruction, the communications apparatus is enabled to perform the method performed by the network device in the third aspect or any possible design of the third aspect.

According to a sixteenth aspect, a communications apparatus is provided. The communications apparatus may be the terminal device in the foregoing method design, or a chip disposed in the terminal device. The communications apparatus includes a memory, configured to store computer executable program code; and a processor, where the processor is coupled to the memory. The program code stored in the memory includes an instruction, and when the processor executes the instruction, the communications apparatus is enabled to perform the method performed by the terminal device in the fourth aspect or any possible design of the fourth aspect.

According to a seventeenth aspect, a communications system is provided. The communications system includes a network device and a terminal device. The network device is configured to: determine an SSB and indication information, and send the SSB and the indication information to the terminal device, where the indication information is used to indicate that a frequency location of the SSB is one of frequencies in a frequency set, and the frequency set includes a first frequency and a second frequency, or includes a first frequency, a second frequency, and a third frequency. The terminal device is configured to: receive the SSB and the indication information from the network device, and determine, based on the indication information, that the frequency location of the SSB is one of the frequencies in the frequency set, where the frequency set includes the first frequency and the second frequency, or includes the first frequency, the second frequency, and the third frequency.

According to an eighteenth aspect, a communications system is provided. The communications system includes a network device and a terminal device. The network device is configured to: determine an SSB, and send the SSB to the terminal device, where a frequency location of the SSB is one of frequencies in a frequency set, the frequency set includes a first frequency and a second frequency, or includes a first frequency, a second frequency, and a third frequency, the first frequency is N×900 kilohertz, the second frequency is (N×900+M×10) kilohertz, and the third frequency is (N×90−M×10) kilohertz, where N is a positive integer. The terminal device is configured to: receive the SSB from the network device, and determine that the frequency location of the SSB is one of the frequencies in the frequency set, where the frequency set includes the first frequency and the second frequency, or includes the first frequency, the second frequency, and the third frequency, the first frequency is N×900 kilohertz, the second frequency is (N×900+M×10) kilohertz, and the third frequency is (N×900−M×10) kilohertz, where N is a positive integer.

The communications system provided in the seventeenth aspect and the communications system provided in the eighteenth aspect may be different communications systems, or may be a same communications system.

According to a nineteenth aspect, a computer readable storage medium is provided. The computer readable storage medium stores an instruction, and when the instruction is run on a computer, the computer is enabled to perform the method in the first aspect or any possible design of the first aspect.

According to a twentieth aspect, a computer readable storage medium is provided. The computer readable storage medium stores an instruction, and when the instruction is run on a computer, the computer is enabled to perform the method in the second aspect or any possible design of the second aspect.

According to a twenty-first aspect, a computer readable storage medium is provided. The computer readable storage medium stores an instruction, and when the instruction is run on a computer, the computer is enabled to perform the method in the third aspect or any possible design of the third aspect.

According to a twenty-second aspect, a computer readable storage medium is provided. The computer readable storage medium stores an instruction, and when the instruction is run on a computer, the computer is enabled to perform the method in the fourth aspect or any possible design of the fourth aspect.

According to a twenty-third aspect, a computer program product including an instruction is provided. The computer program product stores the instruction, and when the instruction is run on a computer, the computer is enabled to perform the method in the first aspect or any possible design of the first aspect.

According to a twenty-fourth aspect, a computer program product including an instruction is provided. The computer program product stores the instruction, and when the instruction is run on a computer, the computer is enabled to perform the method in the second aspect or any possible design of the second aspect.

According to a twenty-fifth aspect, a computer program product including an instruction is provided. The computer program product stores the instruction, and when the instruction is run on a computer, the computer is enabled to perform the method in the third aspect or any possible design of the third aspect.

According to a twenty-sixth aspect, a computer program product including an instruction is provided. The computer program product stores the instruction, and when the instruction is run on a computer, the computer is enabled to perform the method in the fourth aspect or any possible design of the fourth aspect.

In the embodiments of this application, the terminal device can determine the frequency location of the SSB based on the indication information sent by the network device. Therefore, the terminal device can determine the frequency offset between the terminal device and the network device relatively accurately, so as to effectively improve accuracy of adjusting the frequency offset by the terminal device, and reduce the frequency offset between the terminal device and the network device.

DETAILED DESCRIPTION OF ILLUSTRATIVE EMBODIMENTS

Figure 1:
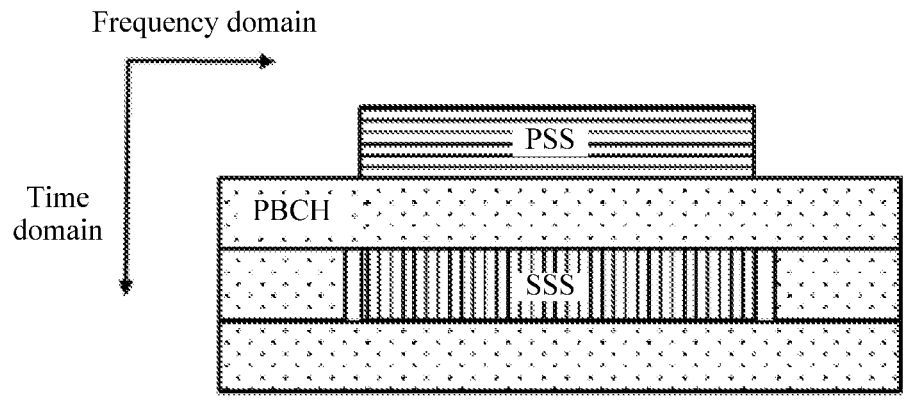
FIG. 1 is a schematic diagram of an SSB.

To make the objectives, technical solutions, and advantages of the embodiments of the present invention clearer, the following further describes the embodiments of the present invention in detail with reference to the accompanying drawings.

The following describes some terms in the embodiments of this application, to facilitate an understanding of a person skilled in the art.

(1) Terminal device: The terminal device includes a device that provides voice and/or data connectivity for a user, for example, may be a handheld device with a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a subscriber unit, a subscriber station, a mobile station, a mobile console, a remote station, an access point (AP), a remote terminal device, an access terminal device, a user terminal device, a user agent, a user device, and the like. For example, the terminal device may include a mobile phone (or referred to as a "cellular" phone), a computer having a mobile terminal device, a portable, pocket-sized, handheld, computer built-in, or vehicle-mounted mobile apparatus, and a smart wearable device. For example, the terminal device includes a device such as a personal communications service (PCS) phone, a cordless telephone set, a session initiation protocol (SIP) phone, a wireless local loop (WLL) station, a personal digital assistant (PDA), a smartwatch, a smart helmet, smart glasses, or a smart band. The terminal device further includes a limited device such as a device having relatively low power consumption, a device having a limited storage capability, or a device having a limited calculation capability. For example, the terminal device includes an information sensing device such as a barcode device, radio frequency identification (RFID) device, a sensor, a global positioning system (GPS), or a laser scanner.

(2) Network device: The network device includes, for example, a base station (for example, an access point), and may be a device that communicates with a wireless terminal device over an air interface in an access network by using one or more cells. The base station may be configured to mutually convert a received over-the-air frame and an internet protocol (IP) packet, and is used as a router between the terminal device and a remaining part of the access network. The remaining part of the access network may include an IP network. The base station may further coordinate attribute management of the air interface. For example, the base station may include an evolved NodeB (NodeB or eNB or e-NodeB, evolutional NodeB) in a long term evolution (LTE) system or an LTE-advanced (LTE-A) system, or may include a next-generation NodeB (gNB) in a 5G NR system. This is not limited in the embodiments of this application.

(3) Subcarrier: A frequency domain resource is divided into several sub-resources in an OFDM system, and each sub-resource in frequency domain may be referred to as a subcarrier. The subcarrier may also be understood as a smallest granularity of a frequency domain resource.

(4) Subcarrier spacing: The subcarrier spacing is an interval between center locations or peak locations of two adjacent subcarriers in frequency domain in the OFDM system. For example, a subcarrier spacing in the LTE system is 15 KHz, and a subcarrier spacing in the 5G NR system may be 15 KHz, 30 KHz, 60 KHz, or 120 KHz.

(5) Resource block: N consecutive subcarriers in frequency domain may be referred to as one resource block. For example, one resource block in the LTE system includes 12 subcarriers, and one resource block in the 5G NR system also includes 12 subcarriers. With evolution of a communications system, one resource block may alternatively include another quantity of subcarriers.

(6) Resource block grid: A location of a start subcarrier of a resource block, namely, a subcarrier numbered 0, is defined in a system when a frequency domain resource is divided into resource blocks. In this case, 12 subcarriers, that is, the subcarrier numbered 0 to a subcarrier numbered 11, may be referred to as one resource block, and the resource block may also be numbered, for example, is numbered 0; 12 subcarriers, that is, a subcarrier numbered 12 to a subcarrier numbered 23, may also be referred to as one resource block, and the resource block is, for example, numbered 1; and so on. However, 12 subcarriers, that is, a subcarrier numbered 1 to a subcarrier numbered 12, cannot be referred to as one resource block. Therefore, it should be understood that a correspondence between a subcarrier and a resource block is defined in the system, and once the correspondence is determined, the resource block grid is determined.

(7) SSB: The SSB is defined in an NR technology in 5G. One SSB includes a primary synchronization signal (PSS), a secondary synchronization signal (SSS), and a physical broadcast channel (PBCH). As shown in FIG. 1, one SSB occupies four consecutive OFDM symbols in time domain; one SSB occupies 240 consecutive subcarriers in frequency domain, and the 240 subcarriers are numbered from 0 to 239. In an OFDM-based communications system, one resource block usually includes 12 consecutive subcarriers, and the 12 subcarriers are numbered from 0 to 11. Therefore, 240 subcarriers occupied by one SSB may also be referred to as 20 resource blocks, and the 20 resource blocks are numbered from 0 to 19. In this specification, that resource blocks, subcarriers, and the like are numbered in ascending order of frequencies is used as an example. It should also be noted that a name of a synchronization signal/broadcast channel block is not limited in this application. The signal may directly be referred to as a synchronization signal or a synchronization signal block, or certainly may have another name. A name of the signal may vary with a communications system. That the signal is referred to as an SSB is merely an example in the embodiments of this application.

Figure 2:
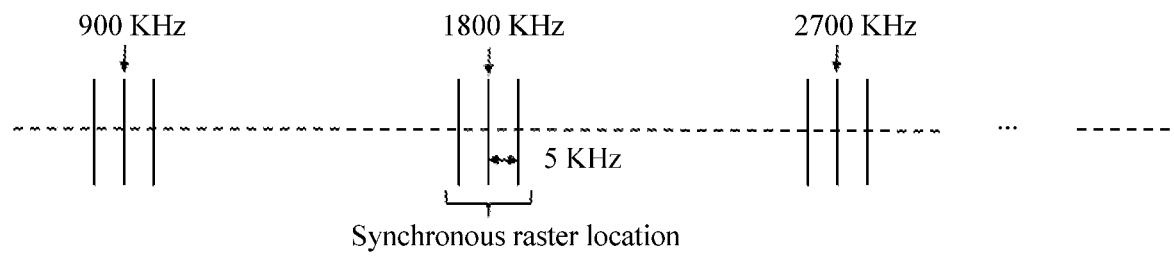
FIG. 2 is a schematic diagram of a synchronous raster location of an SSB.

At present, in a discussion about the NR system in the 3GPP standard, for one SSB, a subcarrier numbered 0 that is occupied by the SSB in a resource block numbered 10 is denoted as a reference subcarrier, and a frequency corresponding to a reference subcarrier in each SSB needs to satisfy a synchronous raster rule. For the SSB in the NR system, the synchronous raster rule is currently that a frequency of a reference subcarrier in an SSB is equal to (N×900 KHz+M×5 KHz), where N is a positive integer, and M is −1, 0, or 1. It can be learned from the synchronous raster rule that the frequency of the reference subcarrier in each SSB in the NR system is one of (895 KHz, goo KHz, 905 KHz, 1795 KHz, . . . ), and the frequencies or locations corresponding to the frequencies may collectively be referred to as a synchronous raster. A specific value range of the synchronous raster depends on a value range of N. Referring to FIG. 2, several synchronous raster locations are illustrated.

It should be noted that, that the subcarrier numbered 0 that is occupied by the SSB in the resource block numbered 10 is denoted as the reference subcarrier is merely an example. Actually, the reference subcarrier may alternatively be a subcarrier at another location in the SSB. For example, with evolution of the communications system, a location of the reference subcarrier may change. This is not limited in the embodiments of this application.

(8) The terms "system" and "network" may be interchangeably used in the embodiments of this application. The term "a plurality of" means two or more, and in view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless specified otherwise.

In addition, unless otherwise stated, ordinal numbers such as "first" and "second" mentioned in the embodiments of this application are used to distinguish between a plurality of objects, but are not intended to limit a sequence, a time sequence, priorities, or importance of the plurality of objects.

For better understanding of the technical solutions provided in the embodiments of this application, the following first describes the technical background of the embodiments of this application.

Currently, before accessing an NR system, a terminal device first needs to search for an SSB broadcast by a network device, for downlink synchronization. The terminal device usually performs a search at a frequency of a synchronous raster. For example, the terminal device first attempts at receiving the SSB at a frequency of 895 KHz, and if successfully receiving the SSB, the terminal device continues to perform a subsequent communication process; or if failing in receiving the SSB, the terminal device attempts at receiving the SSB at a frequency of goo KHz. If successfully receiving the SSB, the terminal device continues to perform a subsequent communication process; or if failing in receiving the SSB, the terminal device continues to attempt at receiving the SSB at another frequency of the synchronous raster until the terminal device successfully receives the SSB.

During hardware implementation, precision of determining a frequency by a crystal oscillator of the terminal device is relatively low, and precision of determining a frequency by a crystal oscillator of the network device is relatively high. The terminal device usually readjusts the frequency of the terminal device based on an SSB received from the network device, to obtain a more precise frequency. In the NR system, a frequency of a reference subcarrier in the SSB broadcast by the network device is, for example, goo MHz. There may be a relatively large deviation in the frequency determined by the terminal device, for example, 899.995 MHz understood by the terminal device is actually goo MHz, and in this case, the terminal device can successfully receive, based on the frequency of 899.995 MHz understood by the terminal device, the SSB broadcast by the network device. Because 899.995 MHz is also a frequency satisfying the synchronous raster rule in the NR system, the terminal device cannot find that there is a deviation between the frequency of the terminal device and the actual frequency. As a result, there is also a frequency deviation in an operating frequency subsequently determined by the terminal device, and performance of communication between the network device and the terminal device may be affected.

In view of this, the embodiments of this application provide the technical solutions, so as to effectively improve accuracy of adjusting a frequency offset by the terminal device, and reduce the frequency offset between the terminal device and the network device.

The embodiments of this application may be applicable to a 5G NR system, and may further be applicable to a next-generation mobile communications system or another similar communications system.

Figure 3:
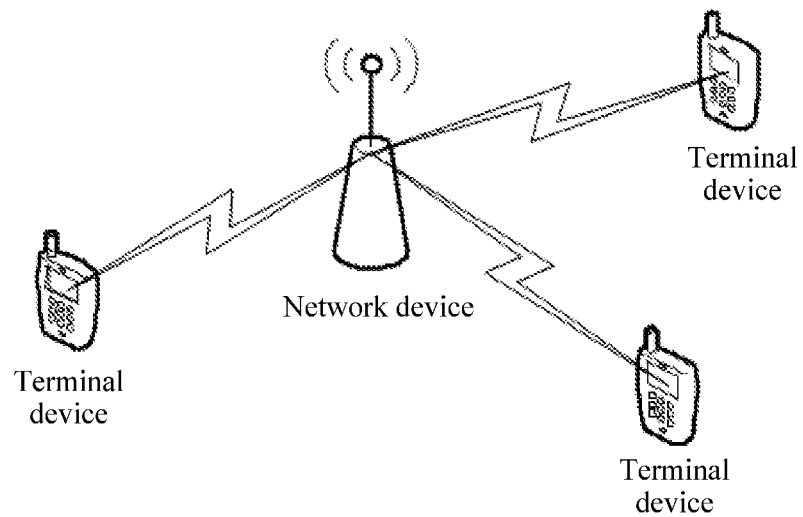
FIG. 3 is a schematic diagram of an application scenario according to an embodiment of this application.

FIG. 3 shows an application scenario according to an embodiment of this application. In FIG. 3, a network device and at least one terminal device are included. The network device and the terminal device operate in a 5G NR communications system. The network device is, for example, a base station. The terminal device and the network device may communicate with each other by using the 5G NR communications system.

It should be noted that a concept of a frequency set in the embodiments of this application is merely used to describe a plurality of frequencies together, but it cannot be understood that a new set entity is defined actually. In other words, optional frequency locations of an SSB are not necessary actually in a frequency set, but these frequencies are optional frequency locations of the SSB. Therefore, for ease of understanding, these frequencies are described as being located in the "frequency set".

Figure 4:
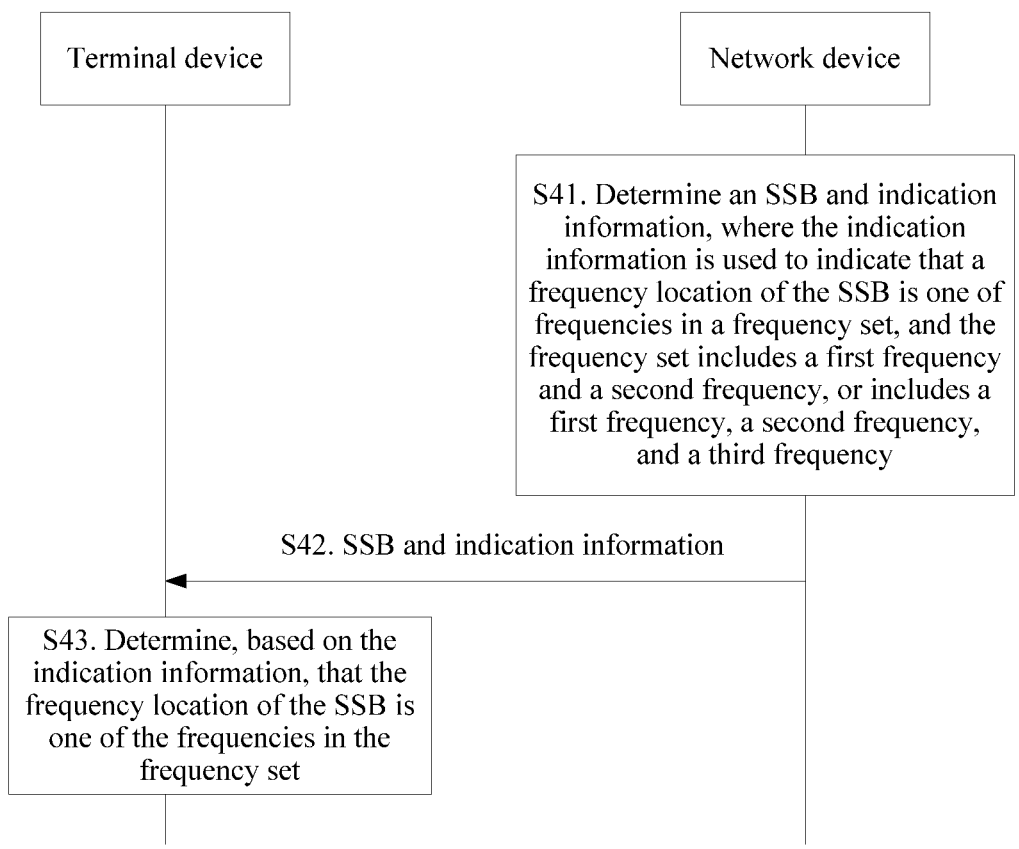
FIG. 4 is a flowchart of a first signal sending and receiving method according to an embodiment of this application.

Referring to FIG. 4, an embodiment of this application provides a first signal sending and receiving method. In the following description process, an example in which the method is applied to the application scenario shown in FIG. 3 is used. A procedure of the method is described as follows:

S41. A network device determines an SSB and indication information, where the indication information is used to indicate that a frequency location of the SSB is one of frequencies in a frequency set, and the frequency set includes a first frequency and a second frequency, or includes a first frequency, a second frequency, and a third frequency.

S42. The network device sends the SSB and the indication information to a terminal device, and the terminal device receives the SSB and the indication information.

S43. The terminal device determines, based on the indication information, that the frequency location of the SSB is one of the frequencies in the frequency set.

In this embodiment of this application, the first frequency is equal to N×900 KHz, the second frequency is equal to (N×900+k) KHz, and the third frequency is equal to (N×900−k) KHz, where N is a positive integer. A value of k is not limited in this embodiment of this application. For example, k is equal to M×5, M×10, or M×20, or k has another value, where M is a positive integer. For example, M may be 1 or 2. For another example, M is not equal to 10. In addition, using the first frequency as a reference, the second frequency is unnecessarily symmetrical with the third frequency herein. In other words, an absolute value of a difference between the second frequency and the first frequency is unnecessarily equal to an absolute value of a difference between the third frequency and the first frequency. Therefore, the first frequency may be equal to N×900 KHz, the second frequency may be equal to (N×900+k1) KHz, and the third frequency may be equal to (N×900−k2) KHz, where k1 and k2 may be or may not be equal. For example, k1 is equal to 5, and k2 is equal to 10. Certainly, k1 and k2 may alternatively be other values.

It can be learned that a frequency should be actually understood as a frequency group based on the value of N. For example, the first frequency should be actually understood as a frequency group, and the frequency group includes {900, 1800, 2700, . . . } KHz. In addition, the frequency set may include only the first frequency, the second frequency, and the third frequency. For example, the first frequency included in the frequency set is N×900 KHz, the second frequency is (N×900+5) KHz, and the third frequency is (N×900−5) KHz. Alternatively, in addition to the first frequency, the second frequency, and the third frequency, the frequency set may further include another frequency such as a fourth frequency and a fifth frequency. For example, the first frequency included in the frequency set is N×900 KHz, the second frequency is (N×900+5) KHz, the third frequency is (N×90−5) KHz, the fourth frequency is (N×900+10) KHz, and the fifth frequency is (N×900−10) KHz. This is not limited in this embodiment of this application. For another example, the frequency set may include only the first frequency and the second frequency, or may include only the first frequency and the third frequency. This is not limited in this embodiment of this application.

In addition, the first frequency is not limited to N×900 KHz, and may be N×600 KHz or N×300 KHz, or certainly may be another value. This is not limited herein. It should be noted that a first frequency defined in an existing wireless communications system is N×900 KHz. With evolution of the system, a value of the first frequency may change. Similarly, the second frequency and the third frequency are not limited in this embodiment of this application either. For example, when the first frequency is N×600 KHz, the second frequency may be (N×600+k) KHz, and the third frequency may be (N×600−k) KHz. It may be understood that the first frequency is equal to (N×P) KHz, the second frequency is equal to (N×P+k) KHz, and the third frequency is equal to (N×P−k) KHz, where P may be equal to goo, or may be another value such as 600 or 300. This is not limited in this embodiment of this application.

In this specification, an example in which the frequency set includes only the first frequency, the second frequency, and the third frequency is mainly used for description. In this case, that the indication information is used to indicate that the frequency location of the SSB is one of the frequencies in the frequency set may be understood as: The indication information is used to indicate that the frequency location of the SSB is the first frequency, the second frequency, or the third frequency. If the frequency set further includes another frequency, for an indication manner of the indication information, reference may be made to manners to be described below in this specification. Details are not described.

It should be understood that the frequency location of the SSB may be a location of a first subcarrier in the SSB, and the first subcarrier may be a reference subcarrier in the SSB. For example, in the prior art, a first subcarrier may be a subcarrier numbered 0 in a resource block numbered 10 in an SSB, namely, a center subcarrier in the SSB. Certainly, the first subcarrier may alternatively be another subcarrier. This is not limited herein.

It should be noted that the network device may not indicate the value of N. Therefore, if the network device indicates that a frequency of the first subcarrier is the first frequency, the second frequency, or the third frequency, the terminal device may successively select a plurality of values of N to detect the SSB. For example, the terminal device may start detection from 1 until the SSB is successfully received. A specific value of N from which the terminal device starts the detection may be stipulated by a protocol, or may be notified by the network device to the terminal device, or certainly may be determined by the terminal device. This is not limited in this embodiment of this application.

In this embodiment of this application, the indication information may directly indicate that the frequency of the first subcarrier is one of the frequencies in the frequency set, for example, directly indicate that the frequency of the first subcarrier is the first frequency, the second frequency, or the third frequency; or may indirectly indicate that the frequency of the first subcarrier is one of the frequencies in the frequency set, for example, indirectly indicate that the frequency of the first subcarrier is the first frequency, the second frequency, or the third frequency.

In a first example of the indirect indication, the indication information may indicate that a deviation between the frequency of the first subcarrier and the first frequency is one of deviations in a deviation set. The deviation set includes 0, a first deviation, and a second deviation. For example, the indication information may be used to indicate that the deviation between the frequency of the first subcarrier and the first frequency is 0, the first deviation, or the second deviation, the first deviation may be understood as a deviation between the first frequency and the second frequency, and the second deviation may be understood as a deviation between the first frequency and the third frequency. Therefore, deviations included in the deviation set are in a one-to-one correspondence with frequencies included in the frequency set. The terminal device may prestore the first frequency. For example, the first frequency is stipulated by a protocol, or the first frequency is sent by the network device to the terminal device in advance. In this case, after receiving the indication information, the terminal device can determine the deviation between the frequency of the first subcarrier and the first frequency based on the indication information, and can determine the frequency of the first subcarrier based on the first frequency and the deviation between the frequency of the first subcarrier and the first frequency. Specifically, if the deviation between the frequency of the first subcarrier and the first frequency is 0, the terminal device determines that the frequency of the first subcarrier is the first frequency; if the deviation between the frequency of the first subcarrier and the first frequency is the first deviation, the terminal device determines that the frequency of the first subcarrier is the second frequency; or if the deviation between the frequency of the first subcarrier and the first frequency is the second deviation, the terminal device determines that the frequency of the first subcarrier is the third frequency. For example, the first deviation is +5 KHz, and the second deviation is −5 KHz. If the indication information indicates that the deviation between the frequency of the first subcarrier and the first frequency is the first deviation, and the terminal device has known that the first frequency is N×900 KHz, the terminal device can determine, based on the first frequency and the first deviation, that the frequency of the first subcarrier is (N×900+5) KHz.

Certainly, if the frequency set further includes another frequency, the deviation set further includes a corresponding deviation. For example, if the frequency set further includes the fourth frequency, the deviation set further includes a third deviation, and the third deviation is a deviation between the fourth frequency and the first frequency. This is not limited in this embodiment of this application.

In a second example of the indirect indication, the indication information may indicate that a frequency type is one of types in a type set, and the type set includes a first type, a second type, and a third type. For example, frequency types are classified in advance, a type of the first frequency is the first type, a type of the second frequency is the second type, and a type of the third frequency is the third type. Therefore, the indication information may be used to indicate that a type of the frequency of the first subcarrier is the first type, the second type, or the third type. The terminal device may prestore a mapping relationship between a frequency and a frequency type. For example, the mapping relationship between a frequency and a frequency type is stipulated by a protocol, or the mapping relationship between a frequency and a frequency type is sent by the network device to the terminal device in advance. In the mapping relationship between a frequency and a frequency type, the type of the first frequency is the first type, the type of the second frequency is the second type, and the type of the third frequency is the third type. Certainly, if the frequency set further includes another frequency, the mapping relationship between a frequency and a frequency type may further include another corresponding mapping relationship. In this case, after receiving the indication information, the terminal device can determine the type of the frequency of the first subcarrier based on the frequency type indicated by the indication information, and then can determine the frequency of the first subcarrier based on the mapping relationship between a frequency and a frequency type. For example, if the type that is of the frequency of the first subcarrier and that is indicated by the indication information is the first type, the terminal device determines, based on the mapping relationship between a frequency and a frequency type, that the frequency of the first subcarrier is the first frequency. Alternatively, if the type that is of the frequency of the first subcarrier and that is indicated by the indication information is the second type, the terminal device determines, based on the mapping relationship between a frequency and a frequency type, that the frequency of the first subcarrier is the second frequency. Alternatively, if the type that is of the frequency of the first subcarrier and that is indicated by the indication information is the third type, the terminal device determines, based on the mapping relationship between a frequency and a frequency type, that the frequency of the first subcarrier is the third frequency.

In a third example of the indirect indication, the indication information may be used to indicate that frequency group information is one piece of group information in a group information set, and the group information set includes a first group, a second group, and a third group. For example, frequencies are grouped in advance, the first frequency belongs to the first group, the second frequency belongs to the second group, and the third frequency belongs to the third group. An example in which the first frequency is equal to N×900 KHz, the second frequency is equal to (N×900+5) KHz, and the third frequency is equal to (N×900−5) KHz is used. It can be learned from different values of N that frequencies included in the first group to which the first frequency belongs are {900, 1800, 2700, . . . } KHz, frequencies included in the second group to which the second frequency belongs are {905, 1805, 2705, . . . } KHz, and frequencies included in the third group to which the third frequency belongs are {895, 1795, 2695, . . . } KHz. Therefore, the indication information may be used to indicate that a group to which the frequency of the first subcarrier belongs is the first group, the second group, or the third group. The terminal device may prestore a mapping relationship between a frequency and a frequency group. For example, the mapping relationship between a frequency and a frequency group is stipulated by a protocol, or the mapping relationship between a frequency and a frequency group is sent by the network device to the terminal device in advance. In the mapping relationship between a frequency and a frequency group, the group of the first frequency is the first group, the group of the second frequency is the second group, and the group of the third frequency is the third group. In this case, after receiving the indication information, the terminal device can determine, based on the frequency group information indicated by the indication information, the group to which the frequency of the first subcarrier belongs, and can determine the frequency of the first subcarrier based on the group to which the frequency of the first subcarrier belongs and the mapping relationship between a frequency and a frequency group. For example, if the group information that is of the frequency of the first subcarrier and that is indicated by the indication information is that the frequency of the first subcarrier belongs to the first group, the terminal device determines, based on the mapping relationship between a frequency and a frequency group, that the frequency of the first subcarrier is the first frequency. Alternatively, if the group information that is of the frequency of the first subcarrier and that is indicated by the indication information is that the frequency of the first subcarrier belongs to the second group, the terminal device determines, based on the mapping relationship between a frequency and a frequency group, that the frequency of the first subcarrier is the second frequency. Alternatively, if the group information that is of the frequency of the first subcarrier and that is indicated by the indication information is that the frequency of the first subcarrier belongs to the third group, the terminal device determines, based on the mapping relationship between a frequency and a frequency group, that the frequency of the first subcarrier is the third frequency.

Certainly, if the frequency set further includes another frequency, the group information set further includes a corresponding group. For example, if the frequency set further includes the fourth frequency, the group information set further includes a fourth group, and the fourth group is corresponding to the fourth frequency. This is not limited in this embodiment of this application.

What is described above is only several examples in which the indication information indirectly indicates the frequency of the first subcarrier. An indication manner used when the indication information indirectly indicates the frequency of the first subcarrier is not limited in this embodiment of this application.

In this embodiment of this application, the indication information indicates that the frequency of the first subcarrier in the SSB is one of the frequencies in the frequency set. Specifically, the indication information may give an indication as a whole, or may give an indication in a level-based indication manner. It can be learned that regardless of whether the indication information gives an indication as a whole, or gives an indication in a level-based indication manner, the indication information may directly indicate that the frequency of the first subcarrier is one of the frequencies in the frequency set, or may indirectly indicate that the frequency of the first subcarrier is one of the frequencies in the frequency set. Therefore, in the following description, the indication information may directly or indirectly indicate that the frequency of the first subcarrier is one of the frequencies in the frequency set. Details are not repeated below. The following separately describes a case of giving an indication as a whole and a case of giving an indication in a level-based indication manner.

I. Indication as a Whole

In this indication manner, the indication information gives an indication as a whole.

For example, the indication information includes a third field in a PBCH in the SSB, or includes a fourth field in remaining minimum system information (RMSI), or certainly may include a field in another message, for example, another system information (OSI). This is not limited herein. In other words, the network device may indicate, by using the third field in the PBCH, the fourth field in the RMSI, or the corresponding field in the another message, that the frequency of the first subcarrier is one of the frequencies in the frequency set.

This indication manner is further divided into an explicit indication manner and an implicit indication manner.

A. Explicit Indication Manner

In a first implementation, the third field or the fourth field includes two bits. When a value of the two bits is 00, it indicates that the frequency of the first subcarrier is the first frequency. When a value of the two bits is 01, it indicates that the frequency of the first subcarrier is the second frequency. When a value of the two bits is 10, it indicates that the frequency of the first subcarrier is the third frequency. When a value of the two bits is 11, the frequency of the first subcarrier is in a reserved state. It should be noted that there may be another correspondence between a value of the two bits and a state indicated by the value. This is only an example, but does not constitute any limitation.

In a second implementation, the third field or the fourth field includes one bit. If the PBCH carries the third field or the RMSI carries the fourth field, and a value of the bit is 0, it indicates that the frequency of the first subcarrier is the second frequency. If the PBCH carries the third field or the RMSI carries the fourth field, and a value of the bit is 1, it indicates that the frequency of the first subcarrier is the third frequency. If the PBCH does not carry the third field or the RMSI does not carry the fourth field, it implicitly indicates that the frequency of the first subcarrier is the first frequency. It should be noted that there may be another correspondence between a value of the bit and a state indicated by the value. This is only an example, but does not constitute any limitation.

Preferably, the indication information may include the third field in the PBCH in the SSB. Because the SSB is usually sent before the RMSI, if the terminal device has determined the frequency of the first subcarrier based on the third field in the PBCH in the SSB, the terminal device can adjust a frequency of the terminal device in time, so that the terminal device can receive the RMSI at a more accurate frequency. In this way, reliability of receiving the RMSI by the terminal device can be improved.

In an implementation, the third field in the PBCH may be a field used to indicate an offset between a location of a second subcarrier in the SSB and a location of a third subcarrier in a reference resource block. The reference resource block may be understood as any resource block in a common resource grid, for example, may be a resource block numbered 0, or certainly may be a resource block numbered another value. A value indicated by the third field may be any one of 0 to 11, or may be any one of 0 to 23. The common resource block grid may be understood as a resource block grid of any downlink signal that is other than the SSB and that is sent by the network device to the terminal device. For example, the downlink signal may be a signal carrying a system message, for example, the RMSI, or certainly may be another downlink signal. It should be noted that a resource block grid of the SSB may be aligned with the common resource block grid. For example, a subcarrier numbered 0 in a resource block in the SSB is aligned with a subcarrier numbered 0 in a resource block in the common resource block grid, a subcarrier numbered 1 in the resource block in the SSB is aligned with a subcarrier numbered 1 in the resource block in the common resource block grid, and so on. Alternatively, a resource block grid of the SSB may not be aligned with the common resource block grid. For example, a subcarrier numbered 0 in a resource block in the SSB is not aligned with a subcarrier numbered 0 in a resource block in the common resource block grid. However, a subcarrier in a resource block in the SSB needs to be aligned with a subcarrier in a common resource block. The alignment herein should be understood as: A center/peak location of a subcarrier in the resource block in the SSB is the same as a center/peak location of a subcarrier in the common resource block. For example, a center/peak location of a subcarrier in the resource block in the SSB is not the same as locations of two subcarriers in the common resource block. Herein, a subcarrier spacing of the SSB may be or may not be equal to a subcarrier spacing of the common resource block. This is not limited herein. When the value indicated by the third field is an even number, it implicitly indicates that a raster location of the SSB is the first frequency; or when the value indicated by the third field is an odd number, it implicitly indicates that a raster location of the SSB is the second frequency or the third frequency. Therefore, the network device may indicate the raster location of the SSB by using the third field.

When the value indicated by the third field is an odd number, it implicitly indicates that the raster location of the SSB is the second frequency or the third frequency. In this case, the terminal device can finally determine the frequency of the first subcarrier by detecting the second frequency and the third frequency. The second frequency greatly differs from the third frequency, so that the terminal device relatively easily distinguishes between the second frequency and the third frequency, and hardly causes confusion. Therefore, in this embodiment of this application, the existing field can directly be used as the indication information, so that not only can a frequency offset between the network device and the terminal device be reduced, but also transmission resources used and parsing complexity of the terminal device can be reduced.

This indication manner is relatively simple and clear, and the frequency of the first subcarrier can directly be indicated by using two bits or one bit, to facilitate an understanding of the terminal device. If the indication information gives an indication by using one bit, less information is required, compared with a case in which the indication information gives an indication by using two bits. This helps reduce transmission resources used.

B. Implicit Indication Manner

In a first implementation, the indication information may be carried in a scrambling code of the PBCH in the SSB.

For example, a scrambling code set may be set for the PBCH by using a protocol, and a quantity of scrambling codes included in the specified scrambling code set may be the same as a quantity of frequencies included in the frequency set. For example, if the frequency set includes the first frequency, the second frequency, and the third frequency, the scrambling code set may include a first scrambling code, a second scrambling code, and a third scrambling code. In addition, a correspondence between a scrambling code and a frequency may be stipulated by a protocol in advance. For example, in the correspondence between a scrambling code and a frequency, the first scrambling code is corresponding to the first frequency, the second scrambling code is corresponding to the second frequency, and the third scrambling code is corresponding to the third frequency. Then, after receiving the PBCH, if the terminal device determines that a scrambling code used for the PBCH is the first scrambling code, the terminal device can determine, based on the correspondence between a scrambling code and a frequency, that the frequency of the first subcarrier is the first frequency. Alternatively, if determining that a scrambling code used for the PBCH is the second scrambling code, the terminal device can determine, based on the correspondence between a scrambling code and a frequency, that the frequency of the first subcarrier is the second frequency. Alternatively, if determining that a scrambling code used for the PBCH is the third scrambling code, the terminal device can determine, based on the correspondence between a scrambling code and a frequency, that the frequency of the first subcarrier is the third frequency. It should be noted that there may be another correspondence between a scrambling code and a state indicated by the scrambling code. This is only an example, but does not constitute any limitation.

In a second implementation, the indication information may be carried in a signal in the SSB.

According to a design of a target SSB, a PSS is transmitted in an OFDM symbol numbered 0 in the SSB. However, in frequency domain, the PSS occupies only a total of 12 subcarriers numbered from 56 to 182. In other words, subcarriers numbered from 0 to 55 and subcarriers numbered from 183 to 239 in the OFDM symbol 0 are not used for signal transmission. Therefore, the network device may send, by using these subcarriers that are not originally used, the signal carrying the indication information.

Figure 5:
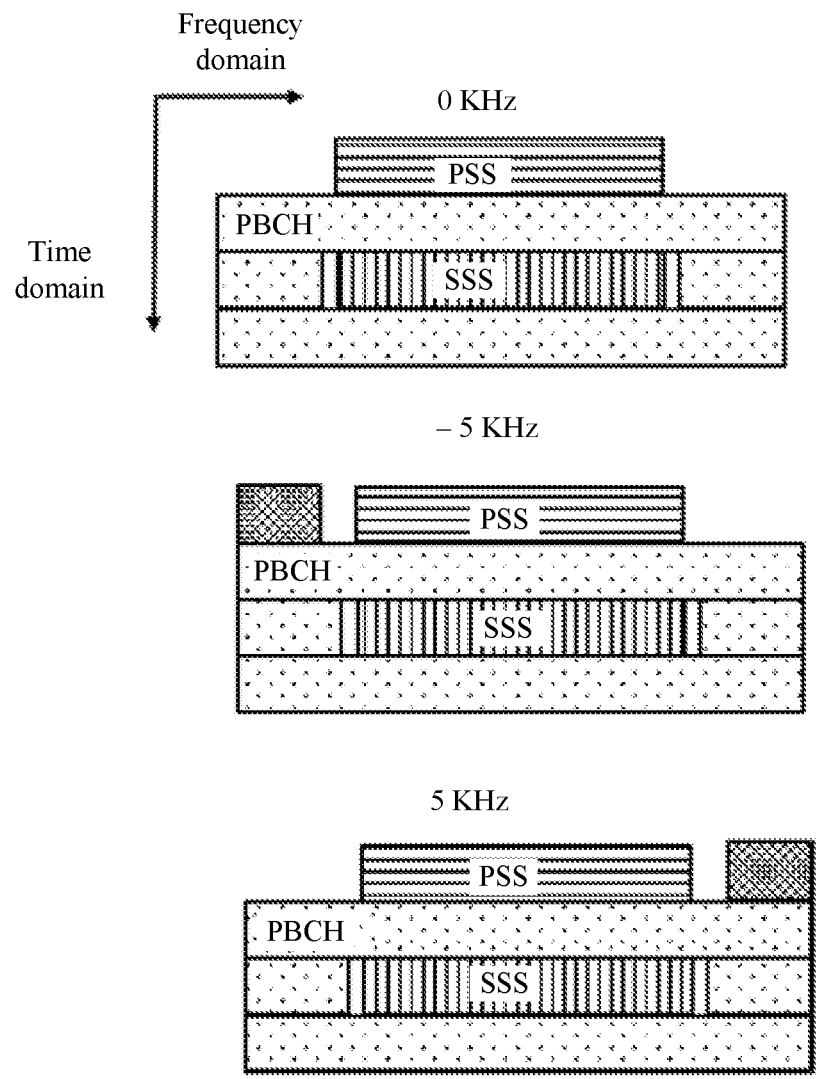
FIG. 5 is a schematic diagram of adding indication information to a signal in an SSB according to an embodiment of this application.

For example, the network device may preset a mapping relationship between a subcarrier occupied by the signal carrying the indication information and a frequency, and the signal carrying the indication information is referred to as, for example, a first signal. For example, referring to FIG. 5, in the mapping relationship between a subcarrier occupied by the first signal and a frequency, when the first signal occupies subcarriers numbered from 0 to 47 in the OFDM symbol 0, a corresponding frequency is the third frequency, and −5 KHz is corresponding to the third frequency in FIG. 5. When the first signal occupies subcarriers numbered from 192 to 239 in the OFDM symbol 0, a corresponding frequency is the second frequency, and 5 KHz is corresponding to the second frequency in FIG. 5. When subcarriers numbered from 0 to 47 and subcarriers numbered from 192 to 239 in the OFDM symbol 0 are not used to transmit the first signal, that is, when the first signal occupies neither the subcarriers numbered from 0 to 47 nor the subcarriers numbered from 192 to 239 in the OFDM symbol 0, a corresponding frequency is the first frequency, and 0 KHz is corresponding to the first frequency in FIG. 5. In this case, it may be considered that the first signal does not occupy any subcarrier in the OFDM symbol 0, or it may be considered that the network device does not send the first signal. It should be noted that there may be another correspondence between a subcarrier occupied by the first signal and a state indicated by the subcarrier. This is only an example, and a quantity of subcarriers occupied by the first signal, locations of the subcarriers, and the like are not limited in this embodiment of this application.

Alternatively, the first signal occupies fixed subcarriers, and different frequencies may be indicated by using different content of the first signal. For example, the network device may preset a mapping relationship between the first signal and a frequency. In the mapping relationship between the first signal and a frequency, if the first signal is a first subsignal, a corresponding frequency is the first frequency; if the first signal is a second subsignal, a corresponding frequency is the second frequency; or if the first signal is a third subsignal, a corresponding frequency is the third frequency. Alternatively, in the mapping relationship between the first signal and a frequency, if the first signal is a first subsignal, a corresponding frequency is the first frequency; if the first signal is a second subsignal, a corresponding frequency is the second frequency; or if the first signal is not transmitted, a corresponding frequency is the third frequency. The first signal always occupies fixed subcarriers in the OFDM symbol 0, for example, occupies the subcarriers numbered from 0 to 47, or occupies the subcarriers numbered from 192 to 239.

The first signal may be a sequence signal, a pilot signal, or an energy signal. This is not limited herein. If the first signal is, for example, a sequence signal, the first subsignal is a first sequence, the second subsignal is a second sequence, and the third subsignal is a third sequence. Alternatively, if the first signal is, for example, a pilot signal, the first subsignal is a first pilot, the second subsignal is a second pilot, the third subsignal is a third pilot, and the like. It should be noted that there may be another correspondence between the first signal and a state indicated by the first signal. This is only an example, but does not constitute any limitation.

II. Level-Based Indication

In this indication manner, the indication information gives a level-based indication.

In a first example of the level-based indication, the indication information may include first indication information and second indication information.

The first indication information is used to indicate that the frequency of the first subcarrier is the first frequency or the fourth frequency, and the fourth frequency is the second frequency or the third frequency. Therefore, if the first indication information indicates that the frequency of the first subcarrier is the first frequency, the terminal device can directly determine, based on the first indication information, that the frequency of the first subcarrier is the first frequency. If the first indication information indicates that the frequency of the first subcarrier is the fourth frequency, the terminal device further needs to determine whether the frequency of the first subcarrier is the second frequency or the third frequency. In this case, the terminal device may further perform determining by using the second indication information. When the first indication information indicates that the frequency of the first subcarrier is the fourth frequency, the second indication information is used to indicate that the frequency of the first subcarrier is the second frequency or the third frequency. In this way, the terminal device can determine the frequency of the first subcarrier by using the first indication information and the second indication information.

In the first example of the level-based indication, the level-based indication manner is also divided into an explicit indication manner and an implicit indication manner.

C. Explicit Indication Manner

For example, the first indication information includes one bit, and the second indication information also includes one bit. If a value of the bit of the first indication information is 0, it indicates that the frequency of the first subcarrier is the first frequency; or if a value of the bit of the first indication information is 1, it indicates that the frequency of the first subcarrier is the fourth frequency. When the value of the bit of the first indication information is 1, if a value of the bit of the second indication information is 0, it indicates that the frequency of the first subcarrier is the second frequency; or if a value of the bit of the second indication information is 1, it indicates that the frequency of the first subcarrier is the third frequency. Certainly, regardless of the first indication information or the second indication information, there may be another correspondence between a value of the bit and a state indicated by the value. This is only an example, but does not constitute any limitation.

For example, the first indication information is a first field in the PBCH, and the second indication information is a second field in the PBCH.

Alternatively, the first indication information is a first field in the PBCH, and the second indication information is a fourth field in the RMSI.

It should be noted that, if the value of the first indication information is 0, theoretically, the network device may not need to send the second indication information. However, if the network device does not send the second indication information, the PBCH or the RMSI lacks one field. The terminal device usually performs detection based on a length of the PBCH carrying the second field or the RMSI carrying the fourth field, and if the PBCH or the RMSI lacks one field, the terminal device possibly cannot detect the PBCH or the RMSI. Therefore, in this embodiment, the network device still sends the second indication information to help the terminal device perform detection. However, if the value of the first indication information is 0, the terminal device may ignore the second indication information, for example, may not need to parse the second indication information. In this case, the second indication information has no effect. Then, when the value of the first indication information is 0, the value of the second indication information may be a random value, or may be set to a default (default) value such as 0 or 1.

D. Implicit Indication Manner

In a first implementation, the first indication information may be carried in a scrambling code of the PBCH in the SSB, and the second indication information may be a fifth field in the PBCH in the SSB or a sixth field in the RMSI.

For example, a scrambling code set may be set for the PBCH by using a protocol, and the specified scrambling code set includes, for example, a first scrambling code and a second scrambling code. It is stipulated that if the first scrambling code is used for the PBCH, it indicates that the frequency of the first subcarrier is the first frequency; or if the second scrambling code is used for the PBCH, it indicates that the frequency of the first subcarrier is the fourth frequency. Then, after receiving the PBCH, if the terminal device determines that the scrambling code used for the PBCH is the first scrambling code, the terminal device can determine that the frequency of the first subcarrier is the first frequency. In this case, the terminal device can determine, based on the first indication information without using the second indication information, that the frequency of the first subcarrier is the first frequency. Alternatively, if determining that the scrambling code used for the PBCH is the second scrambling code, the terminal device can determine that the frequency of the first subcarrier is the fourth frequency. In this case, the terminal device further needs to determine the frequency of the first subcarrier by using the second indication information. For example, the second indication information occupies one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between a scrambling code and a state indicated by the scrambling code, and there may also be another correspondence between a value of the bit of the second indication information and a state indicated by the value. This is only an example, but does not constitute any limitation.

This implementation may be understood as an implicit indication manner. Alternatively, in consideration of the second indication information, this implementation may be understood as an indication manner combining an explicit indication and an implicit indication.

In a second implementation, the first indication information may be a seventh field in the PBCH, and the second indication information may be carried in a scrambling code of the PBCH in the SSB.

The seventh field in the PBCH may be a field used to indicate an offset between a location of a second subcarrier in the SSB and a location of a third subcarrier in a reference resource block. It may be understood that the seventh field in the PBCH and the foregoing third field in the PBCH are a same field. Therefore, for a description of the seventh field in the PBCH, refer to the foregoing description. Details are not described again. When a value indicated by the seventh field is an even number, it implicitly indicates that a raster location of the SSB is the first frequency. When a value indicated by the seventh field is an odd number, it implicitly indicates that a raster location of the SSB is the second frequency or the third frequency. Therefore, the network device may indicate the raster location of the SSB by using the seventh field. Then, after receiving the SSB, if the terminal device determines that the value indicated by the seventh field is an even number, the terminal device can determine that the frequency of the first subcarrier is the first frequency. In this case, the terminal device can determine, based on the first indication information without using the second indication information, that the frequency of the first subcarrier is the first frequency. Alternatively, if the value indicated by the seventh field is an odd number, the terminal device can determine that the frequency of the first subcarrier is the fourth frequency. In this case, the terminal device further needs to determine the frequency of the first subcarrier by using the second indication information. A scrambling code set may be set for the PBCH by using a protocol, and the specified scrambling code set includes, for example, a first scrambling code and a second scrambling code. It is stipulated that if the first scrambling code is used for the PBCH, it indicates that the frequency of the first subcarrier is the second frequency; or if the second scrambling code is used for the PBCH, it indicates that the frequency of the first subcarrier is the third frequency. In this case, if the terminal device needs to use the second indication information, the terminal device determines the scrambling code used for the PBCH. If determining that the first scrambling code is used for the PBCH, the terminal device determines that the frequency of the first subcarrier is the second frequency; or if determining that the second scrambling code is used for the PBCH, the terminal device determines that the frequency of the first subcarrier is the third frequency. It should be noted that there may be another correspondence between a scrambling code and a state indicated by the scrambling code. This is only an example, but does not constitute any limitation.

This implementation may be understood as an implicit indication manner. Alternatively, in consideration of the second indication information, this implementation may be understood as an indication manner combining an explicit indication and an implicit indication.

In a third implementation, the first indication information may be carried in a signal in the SSB, and the second indication information may be a fifth field in the PBCH in the SSB or a sixth field in the RMSI.

According to a design of a target SSB, a PSS is transmitted in an OFDM symbol numbered 0 in the SSB. However, in frequency domain, the PSS occupies only a total of 127 subcarriers numbered from 56 to 182. In other words, subcarriers numbered from 0 to 55 and subcarriers numbered from 183 to 239 in the OFDM symbol 0 are not used for signal transmission. Similarly, in this embodiment, the network device may send, by using these subcarriers that are not originally used, the signal carrying the indication information, and the signal carrying the indication information is referred to as a first signal.

For example, when the first signal occupies subcarriers numbered from 0 to 47 in the OFDM symbol 0 in the SSB, a corresponding frequency is the first frequency. When the first signal occupies subcarriers numbered from 192 to 239 in the OFDM symbol 0, a corresponding frequency is the second frequency or the third frequency. Then, after receiving the PBCH, if the terminal device determines that the first signal occupies the subcarriers numbered from 0 to 47 in the OFDM symbol 0, the terminal device can determine that the frequency of the first subcarrier is the first frequency. In this case, the terminal device can determine, based on the first indication information without using the second indication information, that the frequency of the first subcarrier is the first frequency. Alternatively, if determining that the first signal occupies the subcarriers numbered from 192 to 239 in the OFDM symbol 0, the terminal device can determine that the frequency of the first subcarrier is the fourth frequency. In this case, the terminal device further needs to determine the frequency of the first subcarrier by using the second indication information. For example, the second indication information occupies one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between a subcarrier occupied by the first signal and a state indicated by the subcarrier, and there may also be another correspondence between a value of the bit of the second indication information and a state indicated by the value. This is only an example, but does not constitute any limitation.

Alternatively, the first signal occupies fixed subcarriers, and different frequencies may be indicated by using different content of the first signal. For example, the first signal occupies fixed subcarriers, for example, occupies subcarriers numbered from 0 to 47 in the OFDM symbol 0. If the first signal is a first subsignal, it indicates that the frequency of the first subcarrier is the first frequency; or if the first signal is a second subsignal, it indicates that the frequency of the first subcarrier is the second frequency or the third frequency. Then, after receiving the PBCH, if the terminal device determines that the first signal sent on the subcarriers numbered from 0 to 47 in the OFDM symbol 0 is the first subsignal, the terminal device can determine that the frequency of the first subcarrier is the first frequency. In this case, the terminal device can determine, based on the first indication information without using the second indication information, that the frequency of the first subcarrier is the first frequency. Alternatively, if determining that the first signal sent on the subcarriers numbered from 0 to 47 in the OFDM symbol 0 is the second subsignal, the terminal device can determine that the frequency of the first subcarrier is the fourth frequency. In this case, the terminal device further needs to determine the frequency of the first subcarrier by using the second indication information. For example, the second indication information occupies one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between the first signal and a state indicated by the first signal, and there may also be another correspondence between a value of the bit of the second indication information and a state indicated by the value. This is only an example, but does not constitute any limitation.

This implementation may be understood as an implicit indication manner. Alternatively, in consideration of the second indication information, this implementation may be understood as an indication manner combining an explicit indication and an implicit indication.

In a fourth implementation, the first indication information may be a seventh field in the PBCH, and the second indication information may be carried in a signal in the SSB.

The seventh field in the PBCH may be a field used to indicate an offset between a location of a second subcarrier in the SSB and a location of a third subcarrier in a reference resource block. It may be understood that the seventh field in the PBCH and the foregoing third field in the PBCH are a same field. Therefore, for a description of the seventh field in the PBCH, refer to the foregoing description. Details are not described again. When a value indicated by the seventh field is an even number, it implicitly indicates that a raster location of the SSB is the first frequency. When a value indicated by the seventh field is an odd number, it implicitly indicates that a raster location of the SSB is the second frequency or the third frequency. Therefore, the network device may indicate the raster location of the SSB by using the seventh field. Then, after receiving the SSB, if the terminal device determines that the value indicated by the seventh field is an even number, the terminal device can determine that the frequency of the first subcarrier is the first frequency. In this case, the terminal device can determine, based on the first indication information without using the second indication information, that the frequency of the first subcarrier is the first frequency. Alternatively, if the value indicated by the seventh field is an odd number, the terminal device can determine that the frequency of the first subcarrier is the fourth frequency. In this case, the terminal device further needs to determine the frequency of the first subcarrier by using the second indication information. It may be stipulated by a protocol in advance that when the first signal occupies subcarriers numbered from 0 to 47 in an OFDM symbol 0 in the SSB, a corresponding frequency is the second frequency; or when the first signal occupies subcarriers numbered from 192 to 239 in an OFDM symbol 0, a corresponding frequency is the third frequency. The first signal is a signal carrying the second indication information. Therefore, when the terminal device needs to use the second indication information, the terminal device can determine the subcarriers occupied by the first signal in the OFDM symbol 0. If the first signal occupies the subcarriers numbered from the 0 to 47 in the OFDM symbol 0, the terminal device determines that the frequency of the first subcarrier is the second frequency; or if the first signal occupies the subcarriers numbered from 192 to 239 in the OFDM symbol 0, the terminal device determines that the frequency of the first subcarrier is the third frequency. It should be noted that there may be another correspondence between a subcarrier occupied by the first signal and a state indicated by the subcarrier. This is only an example, but does not constitute any limitation.

Alternatively, when a value indicated by the seventh field is an even number, it implicitly indicates that a raster location of the SSB is the first frequency. When a value indicated by the seventh field is an odd number, it implicitly indicates that a raster location of the SSB is the second frequency or the third frequency. Therefore, the network device may indicate the raster location of the SSB by using the seventh field. Then, after receiving the SSB, if the terminal device determines that the value indicated by the seventh field is an even number, the terminal device can determine that the frequency of the first subcarrier is the first frequency. In this case, the terminal device can determine, based on the first indication information without using the second indication information, that the frequency of the first subcarrier is the first frequency. Alternatively, if the value indicated by the seventh field is an odd number, the terminal device can determine that the frequency of the first subcarrier is the fourth frequency. In this case, the terminal device further needs to determine the frequency of the first subcarrier by using the second indication information. It may be stipulated by a protocol in advance that the first signal occupies fixed subcarriers, for example, occupies subcarriers numbered from 0 to 47 in an OFDM symbol 0. If the first signal is a first subsignal, it indicates that the frequency of the first subcarrier is the second frequency; or if the first signal is a second subsignal, it indicates that the frequency of the first subcarrier is the third frequency. The first signal is a signal carrying the second indication information. Therefore, when the terminal device needs to use the second indication information, the terminal device can determine the first signal transmitted on the subcarriers numbered from 0 to 47 in the OFDM symbol 0. If the first signal is the first subsignal, the terminal device determines that the frequency of the first subcarrier is the second frequency; or if the first signal is the second subsignal, the terminal device determines that the frequency of the first subcarrier is the third frequency. It should be noted that there may be another correspondence between the first signal and a state indicated by the first signal. This is only an example, but does not constitute any limitation.

The first signal may be a sequence signal, a pilot signal, or an energy signal. This is not limited herein. If the first signal is, for example, a sequence signal, the first subsignal is a first sequence, and the second subsignal is a second sequence. Alternatively, if the first signal is, for example, a pilot signal, the first subsignal is a first pilot, the second subsignal is a second pilot, and the like.

In a second example of the level-based indication, the indication information may include first indication information, or the indication information may include first indication information and second indication information. In this embodiment, whether the indication information includes the second indication information depends on a situation.

The first indication information is used to indicate that the frequency of the first subcarrier is the first frequency or the fourth frequency, and the fourth frequency is the second frequency or the third frequency. Therefore, if the first indication information indicates that the frequency of the first subcarrier is the first frequency, the terminal device can directly determine, based on the first indication information, that the frequency of the first subcarrier is the first frequency. In this case, the indication information does not need to include the second indication information. In other words, the network device does not need to send the second indication information. If the first indication information indicates that the frequency of the first subcarrier is the fourth frequency, the terminal device further needs to determine whether the frequency of the first subcarrier is the second frequency or the third frequency. In this case, the indication information further includes the second indication information. In other words, the network device further needs to send the second indication information, and the terminal device can further determine the frequency of the first subcarrier by using the second indication information. When the first indication information indicates that the frequency of the first subcarrier is the fourth frequency, the second indication information is used to indicate that the frequency of the first subcarrier is the second frequency or the third frequency. In this way, the terminal device can determine the frequency of the first subcarrier by using the first indication information or by using the first indication information and the second indication information.

In the second example of the level-based indication, the level-based indication manner is also divided into an explicit indication manner and an implicit indication manner.

E. Explicit Indication Manner

For example, the first indication information includes one bit. If a value of the bit of the first indication information is 0, it indicates that the frequency of the first subcarrier is the first frequency; or if a value of the bit of the first indication information is 1, it indicates that the frequency of the first subcarrier is the fourth frequency. When the value of the bit of the first indication information is 0, the network device does not send the second indication information, and the terminal device can directly determine that the frequency of the first subcarrier is the first frequency. When the value of the bit of the first indication information is 1, the network device further sends the second indication information. For example, the second indication information also includes one bit, and if a value of the bit of the second indication information is 0, it indicates that the frequency of the first subcarrier is the second frequency; or if a value of the bit of the second indication information is 1, it indicates that the frequency of the first subcarrier is the third frequency.

Certainly, regardless of the first indication information or the second indication information, there may be another correspondence between a value of the bit and a state indicated by the value. This is only an example, but does not constitute any limitation.

For example, the first indication information is a first field in the PBCH, and the second indication information is a second field in the PBCH.

Alternatively, the first indication information is a first field in the PBCH, and the second indication information is a fourth field in the RMSI.

In this embodiment of this application, if the value of the first indication information is 0, the network device does not need to send the second indication information. This helps reduce transmission resources used. For the terminal device, it may be set that the terminal device can not only perform detection based on a length of the PBCH carrying the second field or the RMSI carrying the fourth field, but also can perform detection based on a length of the PBCH that does not carry the second field or the RMSI that does not carry the fourth field.

However, if the network device does not send the second indication information, the PBCH or the RMSI lacks one field. Therefore, in this embodiment, it may be set that the terminal device not only can perform detection based on a length of the PBCH carrying the second field or the RMSI carrying the fourth field, but also can perform detection based on a length of the PBCH that does not carry the second field or the RMSI that does not carry the fourth field. For example, the terminal device may first perform detection based on the length of the PBCH carrying the second field or the RMSI carrying the fourth field. If the detection succeeds, it indicates that the indication information includes only the first indication information. If the detection fails, the terminal device continues to perform detection based on the length of the PBCH that does not carry the second field or the RMSI that does not carry the fourth field. This manner ensures that the terminal device can perform detection, and helps reduce transmission resources used.

F. Implicit Indication Manner

In a first implementation of the implicit indication manner, the first indication information may be carried in a scrambling code of the PBCH in the SSB.

For example, a scrambling code set may be set for the PBCH by using a protocol, and the specified scrambling code set includes, for example, a first scrambling code and a second scrambling code. It is stipulated that if the first scrambling code is used for the PBCH, it indicates that the frequency of the first subcarrier is the first frequency; or if the second scrambling code is used for the PBCH, it indicates that the frequency of the first subcarrier is the fourth frequency. Then, after receiving the PBCH, if the terminal device determines that the scrambling code used for the PBCH is the first scrambling code, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. Alternatively, if determining that the scrambling code used for the PBCH is the second scrambling code, the terminal device can determine that the frequency of the first subcarrier is the fourth frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is a fifth field in the PBCH in the SSB or a sixth field in the RMSI. The second indication information occupies, for example, one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between a scrambling code and a state indicated by the scrambling code, and there may also be another correspondence between a value of the bit of the second indication information and a state indicated by the value. This is only an example, but does not constitute any limitation.

This implementation may be understood as an implicit indication manner. Alternatively, in consideration of the second indication information, this implementation may be understood as an indication manner combining an explicit indication and an implicit indication.

In a second implementation of the implicit indication manner, the first indication information may be an eighth field in the PBCH in the SSB.

The eighth field in the PBCH may be a field used to indicate an offset between a location of a second subcarrier in the SSB and a location of a third subcarrier in a reference resource block. It may be understood that the eighth field in the PBCH and the foregoing third field or the foregoing seventh field in the PBCH are a same field. Therefore, for a description of the eighth field in the PBCH, refer to the foregoing description. Details are not described again. When a value indicated by the eighth field is an even number, it implicitly indicates that a raster location of the SSB is the first frequency. When a value indicated by the eighth field is an odd number, it implicitly indicates that a raster location of the SSB is the second frequency or the third frequency. Therefore, the network device may indicate the raster location of the SSB by using the eighth field. Then, after receiving the SSB, if the terminal device determines that the value indicated by the eighth field is an even number, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. If determining that the value indicated by the eighth field is an odd number, the terminal device can determine that the frequency of the first subcarrier is the second frequency or the third frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is carried in a scrambling code of the PBCH in the SSB. A scrambling code set may be set for the PBCH by using a protocol, and the specified scrambling code set includes, for example, a first scrambling code and a second scrambling code. It is stipulated that if the first scrambling code is used for the PBCH, it indicates that the frequency of the first subcarrier is the second frequency; or if the second scrambling code is used for the PBCH, it indicates that the frequency of the first subcarrier is the third frequency. In this case, if the terminal device needs to use the second indication information, the terminal device determines the scrambling code used for the PBCH. If determining that the first scrambling code is used for the PBCH, the terminal device determines that the frequency of the first subcarrier is the second frequency; or if determining that the second scrambling code is used for the PBCH, the terminal device determines that the frequency of the first subcarrier is the third frequency. It should be noted that there may be another correspondence between a scrambling code and a state indicated by the scrambling code. This is only an example, but does not constitute any limitation.

In a third implementation of the implicit indication manner, the first indication information may be carried in a signal in the SSB.

Similarly, in this embodiment, the network device may send, by using subcarriers that are not originally used in an OFDM symbol 0 in the SSB, the signal carrying the first indication information, and the signal carrying the first indication information is referred to as a first signal.

For example, when the first signal occupies subcarriers numbered from 0 to 47 in the OFDM symbol 0, a corresponding frequency is the first frequency. When the first signal occupies subcarriers numbered from 192 to 239 in the OFDM symbol 0, a corresponding frequency is the second frequency or the third frequency. Then, after receiving the PBCH, if the terminal device determines that the first signal occupies the subcarriers numbered from 0 to 47 in the OFDM symbol 0, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. Alternatively, if determining that the first signal occupies the subcarriers numbered from 192 to 239 in the OFDM symbol 0, the terminal device can determine that the frequency of the first subcarrier is the fourth frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is a fifth field in the PBCH in the SSB or a sixth field in the RMSI. For example, the second indication information occupies one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between a subcarrier occupied by the first signal and a state indicated by the subcarrier, and there may also be another correspondence between a value of the bit of the second indication information and a state indicated by the value. This is only an example, but does not constitute any limitation.

Alternatively, the first signal occupies fixed subcarriers, and different frequencies may be indicated by using different content of the first signal. For example, the first signal occupies fixed subcarriers, for example, occupies subcarriers numbered from 0 to 47 in the OFDM symbol 0. If the first signal is a first subsignal, it indicates that the frequency of the first subcarrier is the first frequency; or if the first signal is a second subsignal, it indicates that the frequency of the first subcarrier is the second frequency or the third frequency. Then, after receiving the PBCH, if the terminal device determines that the first signal sent on the subcarriers numbered from 0 to 47 in the OFDM symbol 0 is the first subsignal, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. Alternatively, if determining that the first signal sent on the subcarriers numbered from 0 to 47 in the OFDM symbol 0 is the second subsignal, the terminal device can determine that the frequency of the first subcarrier is the fourth frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is a fifth field in the PBCH in the SSB or a sixth field in the RMSI. For example, the second indication information occupies one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between the first signal and a state indicated by the first signal, and there may also be another correspondence between a value of the bit of the second indication information and a state indicated by the value. This is only an example, but does not constitute any limitation.

This implementation may be understood as an implicit indication manner. Alternatively, in consideration of the second indication information, this implementation may be understood as an indication manner combining an explicit indication and an implicit indication.

In a fourth implementation of the implicit indication manner, the first indication information may be an eighth field in the PBCH in the SSB.

For a description of the eighth field in the PBCH, refer to the foregoing description. Details are not described again. When a value indicated by the eighth field is an even number, it implicitly indicates that a raster location of the SSB is the first frequency. When a value indicated by the eighth field is an odd number, it implicitly indicates that a raster location of the SSB is the second frequency or the third frequency. Therefore, the network device may indicate the raster location of the SSB by using the eighth field. Then, after receiving the SSB, if the terminal device determines that the value indicated by the eighth field is an even number, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. If determining that the value indicated by the eighth field is an odd number, the terminal device can determine that the frequency of the first subcarrier is the second frequency or the third frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is carried in a signal in the SSB. It may be stipulated by a protocol in advance that when the first signal occupies subcarriers numbered from 0 to 47 in an OFDM symbol 0 in the SSB, a corresponding frequency is the second frequency; or when the first signal occupies subcarriers numbered from 192 to 239 in an OFDM symbol 0, a corresponding frequency is the third frequency. The first signal is a signal carrying the second indication information. Therefore, when the terminal device needs to use the second indication information, the terminal device can determine the subcarriers occupied by the first signal in the OFDM symbol 0. If the first signal occupies the subcarriers numbered from 0 to 47 in the OFDM symbol 0, the terminal device determines that the frequency of the first subcarrier is the second frequency; or if the first signal occupies the subcarriers numbered from 192 to 239 in the OFDM symbol 0, the terminal device determines that the frequency of the first subcarrier is the third frequency. It should be noted that there may be another correspondence between a subcarrier occupied by the first signal and a state indicated by the subcarrier. This is only an example, but does not constitute any limitation.

Alternatively, when a value indicated by the eighth field is an even number, it implicitly indicates that a raster location of the SSB is the first frequency. When a value indicated by the eighth field is an odd number, it implicitly indicates that a raster location of the SSB is the second frequency or the third frequency. Therefore, the network device may indicate the raster location of the SSB by using the eighth field. Then, after receiving the SSB, if the terminal device determines that the value indicated by the eighth field is an even number, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. If determining that the value indicated by the eighth field is an odd number, the terminal device can determine that the frequency of the first subcarrier is the second frequency or the third frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is carried in a signal in the SSB. It may be stipulated by a protocol in advance that the first signal occupies fixed subcarriers, for example, occupies subcarriers numbered from 0 to 47 in an OFDM symbol 0. If the first signal is a first subsignal, it indicates that the frequency of the first subcarrier is the second frequency; or if the first signal is a second subsignal, it indicates that the frequency of the first subcarrier is the third frequency. The first signal is a signal carrying the second indication information. Therefore, when the terminal device needs to use the second indication information, the terminal device can determine the first signal transmitted on the subcarriers numbered from 0 to 47 in the OFDM symbol 0. If the first signal is the first subsignal, the terminal device determines that the frequency of the first subcarrier is the second frequency; or if the first signal is the second subsignal, the terminal device determines that the frequency of the first subcarrier is the third frequency. It should be noted that there may be another correspondence between the first signal and a state indicated by the first signal. This is only an example, but does not constitute any limitation.

The first signal may be a sequence signal, a pilot signal, or an energy signal. This is not limited herein. If the first signal is, for example, a sequence signal, the first subsignal is a first sequence, and the second subsignal is a second sequence. Alternatively, if the first signal is, for example, a pilot signal, the first subsignal is a first pilot, the second subsignal is a second pilot, and the like.

The foregoing describes a plurality of manners of enabling the terminal device to determine the frequency of the first subcarrier. In a specific application process, any manner thereof may be selected, or a specific manner to be used may be stipulated by a protocol.

After determining the frequency of the first subcarrier, the terminal device can adjust a frequency of the terminal device based on the frequency of the first subcarrier. This helps improve precision of adjusting the frequency by the terminal device, and reduce a frequency offset between the terminal device and the network device.

Figure 6:
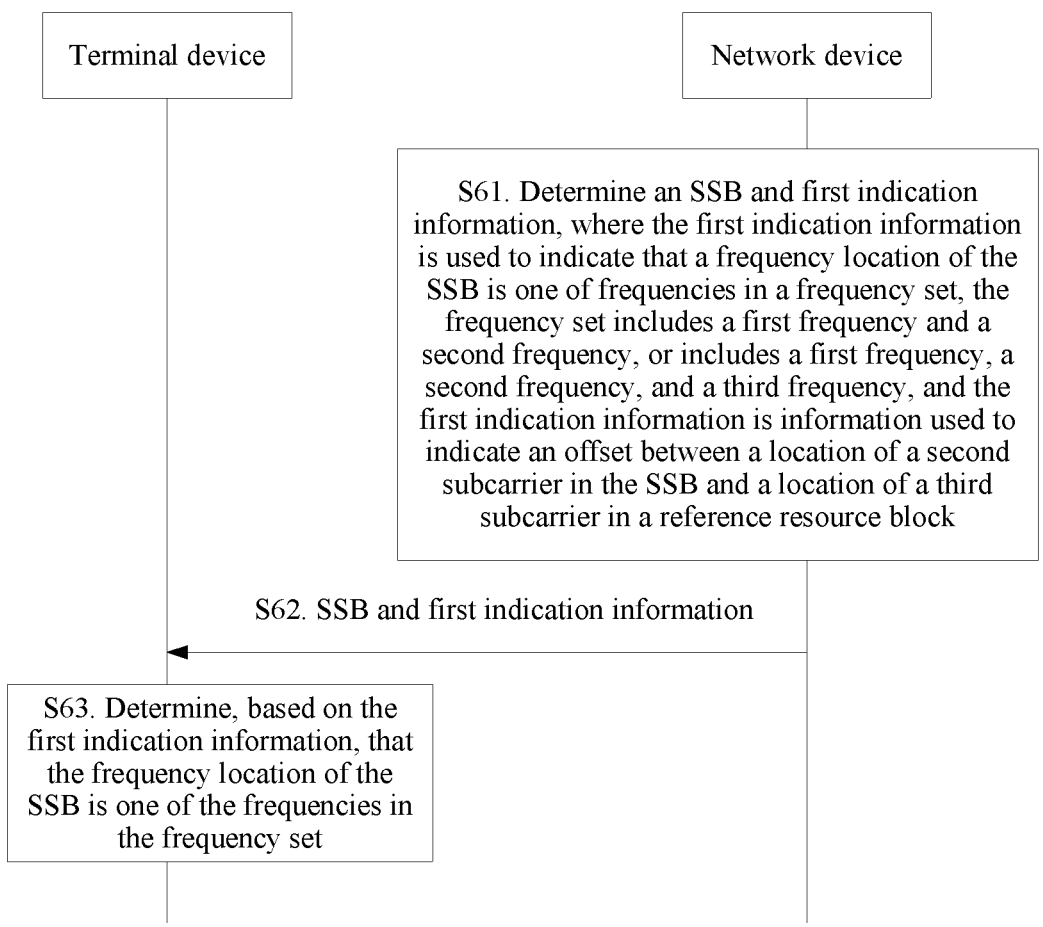
FIG. 6 is a flowchart of a second signal sending and receiving method according to an embodiment of this application.

To improve accuracy of adjusting a frequency offset by a terminal device, an embodiment of this application provides a second signal sending and receiving method below, as shown in FIG. 6. In the following description process, an example in which the method is applied to the application scenario shown in FIG. 3 is used. A procedure of the method is described as follows:

S61. A network device determines an SSB and first indication information, where the first indication information is used to indicate that a frequency location of the SSB is one of frequencies in a frequency set, and the frequency set includes a first frequency and a second frequency, or includes a first frequency, a second frequency, and a third frequency, and the first indication information is information used to indicate an offset between a location of a second subcarrier in the SSB and a location of a third subcarrier in a reference resource block.

S62. The network device sends the SSB and the first indication information to a terminal device, and the terminal device receives the SSB and the first indication information.

The terminal device may receive the SSB in the following manner:

The terminal device determines a first center frequency and a second center frequency. The first center frequency is a frequency corresponding to a direct current subcarrier on which the terminal device receives a signal from the network device, and the second center frequency is a frequency corresponding to a direct current subcarrier on which the network device sends a signal to the terminal device.

The terminal device receives the SSB from the network device based on the first center frequency and the second center frequency.

In the prior art, when receiving the SSB, the terminal device receives the SSB based on the first center frequency. The first center frequency may be understood as a center of a receiving bandwidth of the terminal device, or the first center frequency may be understood as a frequency of a direct current location at which the terminal device receives a signal, or a frequency corresponding to a direct current subcarrier. When sending the SSB to the terminal device, the network device sends the SSB by using the second center frequency. The second center frequency may be understood as a center of a sending bandwidth of the network device, or the second center frequency may be understood as a frequency of a direct current location at which the network device sends a signal, or a frequency corresponding to a direct current subcarrier. In this embodiment of this application, the terminal device determines the first center frequency and the second center frequency. It should be noted that the second center frequency determined by the terminal device should be understood as the frequency, "understood by the terminal device", of the direct current location at which the network device sends a signal, and the second center frequency determined by the terminal device is unnecessarily equal to the frequency corresponding to the direct current subcarrier on which the network device sends a signal. The two frequencies may be equal or may not be equal. Specifically, the terminal device receives the SSB based on the first center frequency, and adjusts a signal phase based on the first center frequency and the second center frequency or based on a difference between the first center frequency and the second center frequency. The second center frequency may be predetermined. For example, a value of the second center frequency may be stipulated by a protocol, or a rule of determining the second center frequency by the terminal device may be stipulated by a protocol, so that the terminal device can determine the second center frequency. Alternatively, the second center frequency may be notified by the network device to the terminal device.

It should be noted that in this embodiment of this application, a method for determining the second center frequency and/or receiving the SSB based on the second center frequency by the terminal device may also be applied to all applicable cases in addition to this embodiment of this application. For example, when the network device does not send the first indication information to the terminal device, the terminal device may receive the SSB by using the method. Moreover, the method may also be applied to a case in which the terminal device receives a signal other than the SSB. For example, the another signal may be RMSI.

In addition, the first center frequency, the second center frequency, and the like are merely names provided in this specification, but are not intended to constitute any limitation on the frequencies. In addition, the frequency is unnecessarily referred to as a "center frequency".

S63. The terminal device determines, based on the first indication information, that the frequency location of the SSB is one of the frequencies in the frequency set.

For descriptions of some concepts such as the frequency location of the SSB, the frequency set, the first frequency, the second frequency, and the third frequency, refer to the embodiment shown in FIG. 4. Details are not described again. It should be understood that in this embodiment of this application, the frequency location of the SSB may be a location of a first subcarrier in the SSB. For a description of the first subcarrier, refer to the embodiment shown in FIG. 4. Details are not described again.

In this embodiment of this application, the first indication information is, for example, a first field in a PBCH in the SSB, and the first field in the PBCH may be a field used to indicate an offset between a location of a second subcarrier in the SSB and a location of a third subcarrier in a reference resource block. It may be understood that the first field in the PBCH and the foregoing third field, the foregoing seventh field, or the foregoing eighth field in the PBCH are a same field. Therefore, for a description of the first field in the PBCH, refer to the related description in the embodiment shown in FIG. 4. Details are not described again. It may be understood that when a value indicated by the first field is an even number, it implicitly indicates that a raster location of the SSB is the first frequency; or when a value indicated by the first field is an odd number, it implicitly indicates that a raster location of the SSB is the second frequency or the third frequency. Therefore, the network device may indicate the raster location of the SSB by using the first field.

If the value indicated by the first field is an odd number, it implicitly indicates that the raster location of the SSB is the second frequency or the third frequency. In this case, the terminal device can finally determine a frequency of the first subcarrier by detecting the second frequency and the third frequency. The second frequency greatly differs from the third frequency, so that the terminal device relatively easily distinguishes between the second frequency and the third frequency, and hardly causes confusion. Therefore, in this embodiment of this application, the existing field can directly be used as indication information, so that not only can a frequency offset between the network device and the terminal device be reduced, but also transmission resources used and parsing complexity of the terminal device can be reduced.

Alternatively, if the value indicated by the first field is an odd number, it implicitly indicates that the raster location of the SSB is the second frequency or the third frequency. In this case, the terminal device can further determine a frequency of the first subcarrier finally by using second indication information. For the second indication information, two cases are as follows.

In a first case, the indication information may include the first indication information and the second indication information.

The first indication information is used to indicate that the frequency of the first subcarrier is the first frequency or a fourth frequency, and the fourth frequency is the second frequency or the third frequency. Therefore, if the first indication information indicates that the frequency of the first subcarrier is the first frequency, the terminal device can directly determine, based on the first indication information, that the frequency of the first subcarrier is the first frequency. If the first indication information indicates that the frequency of the first subcarrier is the fourth frequency, the terminal device further needs to determine whether the frequency of the first subcarrier is the second frequency or the third frequency. In this case, the terminal device may further perform determining by using the second indication information. When the first indication information indicates that the frequency of the first subcarrier is the fourth frequency, the second indication information is used to indicate that the frequency of the first subcarrier is the second frequency or the third frequency. In this way, the terminal device can determine the frequency of the first subcarrier by using the first indication information and the second indication information.

For example, the second indication information is a second field in the PBCH, or the second indication information is a fourth field in RMSI, or may be a field in another message. Preferably, the second indication information may be the second field in the PBCH in the SSB. Because the SSB is usually sent before the RMSI, if the terminal device has determined the frequency of the first subcarrier based on the second field in the PBCH in the SSB, the terminal device can adjust a frequency of the terminal device in time, so that the terminal device can receive the RMSI at a more accurate frequency. In this way, reliability of receiving the RMSI by the terminal device can be improved.

For example, after receiving the SSB, if the terminal device determines that a value indicated by the first field is an even number, the terminal device can determine that the frequency of the first subcarrier is the first frequency. In this case, the terminal device can determine, based on the first indication information without using the second indication information, that the frequency of the first subcarrier is the first frequency. Alternatively, if a value indicated by the first field is an odd number, the terminal device can determine that the frequency of the first subcarrier is the fourth frequency. In this case, the terminal device further needs to determine the frequency of the first subcarrier by using the second indication information. For example, the second field or the fourth field includes one bit, and if a value of the bit of the second field or the fourth field is 0, the terminal device determines that the frequency of the first subcarrier is the second frequency; or if a value of the bit of the second field or the fourth field is 1, the terminal device determines that the frequency of the first subcarrier is the third frequency. It should be noted that there may be another correspondence between a value of the bit and a state indicated by the value. This is only an example, but does not constitute any limitation.

It should be noted that, if a value of the first indication information is 0, theoretically, the network device may not need to send the second indication information. However, if the network device does not send the second indication information, the PBCH or the RMSI lacks one field. The terminal device usually performs detection based on a length of the PBCH carrying the second field or the RMSI carrying the fourth field, and if the PBCH or the RMSI lacks one field, the terminal device possibly cannot detect the PBCH or the RMSI. Therefore, in this embodiment, the network device still sends the second indication information to help the terminal device perform detection. However, if the value of the first indication information is 0, the terminal device may ignore the second indication information, for example, may not need to parse the second indication information. In this case, the second indication information has no effect. Then, when the value of the first indication information is 0, a value of the second indication information may be a random value, or may be set to a default value such as 0 or 1. In this case, it may be understood that the network device implicitly indicates the raster location of the SSB by using only the first indication information. Alternatively, it may be understood that the network device indicates the raster location of the SSB by using both the first indication information and the second indication information.

In a second case, the indication information includes the first indication information, or the indication information includes the first indication information and the second indication information. In this embodiment, whether the indication information includes the second indication information depends on a situation.

The first indication information is used to indicate that the frequency of the first subcarrier is the first frequency or a fourth frequency, and the fourth frequency is the second frequency or the third frequency. Therefore, if the first indication information indicates that the frequency of the first subcarrier is the first frequency, the terminal device can directly determine, based on the first indication information, that the frequency of the first subcarrier is the first frequency. In this case, the indication information does not need to include the second indication information. In other words, the network device does not need to send the second indication information. If the first indication information indicates that the frequency of the first subcarrier is the fourth frequency, the terminal device further needs to determine whether the frequency of the first subcarrier is the second frequency or the third frequency. In this case, the indication information further includes the second indication information. In other words, the network device further needs to send the second indication information, and the terminal device can further determine the frequency of the first subcarrier by using the second indication information. When the first indication information indicates that the frequency of the first subcarrier is the fourth frequency, the second indication information is used to indicate that the frequency of the first subcarrier is the second frequency or the third frequency. In this way, the terminal device can determine the frequency of the first subcarrier by using the first indication information or by using the first indication information and the second indication information.

For example, the second indication information is a second field in the PBCH, or the second indication information is a fourth field in RMSI, or may be a field in another message. Preferably, the second indication information may be the second field in the PBCH in the SSB. Because the SSB is usually sent before the RMSI, if the terminal device has determined the frequency of the first subcarrier based on the second field in the PBCH in the SSB, the terminal device can adjust a frequency of the terminal device in time, so that the terminal device can receive the RMSI at a more accurate frequency. In this way, reliability of receiving the RMSI by the terminal device can be improved.

For example, after receiving the SSB, if the terminal device determines that a value indicated by the first field is an even number, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. Alternatively, if a value indicated by the first field is an odd number, the terminal device can determine that the frequency of the first subcarrier is the fourth frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second field or the fourth field includes one bit, and if a value of the bit of the third field or the fourth field is 0, the terminal device determines that the frequency of the first subcarrier is the second frequency; or if a value of the bit of the third field or the fourth field is 1, the terminal device determines that the frequency of the first subcarrier is the third frequency. It should be noted that there may be another correspondence between a value of the bit and a state indicated by the value. This is only an example, but does not constitute any limitation.

It should be noted that currently, for a frequency band lower than 6 GHz, the first indication information includes five bits; and for a frequency band higher than 6 GHz, the first indication information includes four bits. In this embodiment of this application, the second indication information includes, for example, one bit. Optionally, the first indication information and the second indication information may be jointly encoded as one indicator field. For example, when the first indication information includes five bits, a 6-bit field may be used as an indication field to indicate content that originally needs to be indicated by the first indication information and the second indication information, which is listed in Table 1.

TABLE 1

| Indicator field | Resource block grid offset | Raster frequency offset (KHz) of an SSB |
|---|---|---|
| 0 | 0 | 0 |
| 1 | 1 | 5 |
| 2 | 1 | −5 |
| 3 | 2 | 0 |
| 4 | 3 | 5 |
| 5 | 3 | −5 |
| 6 | 4 | 0 |
| 7 | 5 | 5 |
| 8 | 5 | −5 |
| 9 | 6 | 0 |
| 10 | 7 | 5 |
| 11 | 7 | −5 |
| 12 | 8 | 0 |
| 13 | 9 | 5 |
| 14 | 9 | −5 |
| 15 | 10 | 0 |
| 16 | 11 | 5 |
| 17 | 11 | −5 |
| 18 | 12 | 0 |
| 19 | 13 | 5 |
| 20 | 13 | −5 |
| 21 | 14 | 0 |
| 22 | 15 | 5 |
| 23 | 15 | −5 |
| 24 | 16 | 0 |
| 25 | 17 | 5 |
| 26 | 17 | −5 |
| 27 | 18 | 0 |
| 28 | 19 | 5 |
| 29 | 19 | −5 |
| 30 | 20 | 0 |
| 31 | 21 | 5 |
| 32 | 21 | −5 |
| 33 | 22 | 0 |
| 34 | 23 | 5 |
| 35 | 23 | −5 |
| 36-63 | Reserved | |

In Table 1, the indicator field represents a value of the 6-bit indication field, the resource block grid offset represents the offset, indicated by the first indication information, between the location of the second subcarrier in the SSB and the location of the third subcarrier in the reference resource block, and the raster frequency offset of the SSB is a deviation between the frequency of the first subcarrier and the first frequency. It can be learned that an example in which the first frequency is equal to N×900 KHz, the second frequency is equal to (N×900+5) KHz, and the third frequency is equal to (N×900−5) KHz is used in Table 1, and an example in which a frequency is indirectly indicated by indicating a frequency offset is used in Table 1. For example, when the indicator field is equal to 0, the offset, indicated by the first indication information, between the location of the second subcarrier in the SSB and the location of the third subcarrier in the reference resource block is 0, and the indicated deviation between the frequency of the first subcarrier and the first frequency is 0. This means that the indicated frequency of the first subcarrier is the first frequency.

It should be noted that Table 1 is only an example. A correspondence among a status of the joint indicator field, the resource block grid offset, and the raster location offset of the SSB is not limited to that listed in Table 1, and there may be another correspondence. This is not limited herein. In addition, names and types in the columns of Table 1 are not limited. For example, the raster location offset of the SSB may alternatively be a frequency or a frequency number of the SSB, or may be a frequency or a frequency number of a reference subcarrier of the SSB.

When the first frequency is equal to N×900 KHz, the second frequency is equal to (N×900−10) KHz, and the third frequency is equal to (N×900+10) KHz, for example, when the first indication information includes five bits, a 6-bit indication field is still used to indicate content that originally needs to be indicated by the first indication information and the second indication information, which may be listed in Table 2.

TABLE 2

| Indicator field | Resource block grid offset | Raster frequency offset (KHz) of an SSB |
|---|---|---|
| 0 | 0 | 0 |
| 1 | 0 | 10 |
| 2 | 0 | −10 |
| 3 | 2 | 0 |
| 4 | 2 | 10 |
| 5 | 2 | −10 |
| 6 | 4 | 0 |
| 7 | 4 | 10 |
| 8 | 4 | −10 |
| 9 | 6 | 0 |
| 10 | 6 | 10 |
| 11 | 6 | −10 |
| 12 | 8 | 0 |
| 13 | 8 | 10 |
| 14 | 8 | −10 |
| 15 | 10 | 0 |
| 16 | 10 | 10 |
| 17 | 10 | −10 |
| 18 | 12 | 0 |
| 19 | 12 | 10 |
| 20 | 12 | −10 |
| 21 | 14 | 0 |
| 22 | 14 | 10 |
| 23 | 14 | −10 |
| 24 | 16 | 0 |
| 25 | 16 | 10 |
| 26 | 16 | −10 |
| 27 | 18 | 0 |
| 28 | 18 | 10 |
| 29 | 18 | −10 |
| 30 | 20 | 0 |
| 31 | 20 | 10 |
| 32 | 20 | −10 |
| 33 | 22 | 0 |
| 34 | 22 | 10 |
| 35 | 22 | −10 |
| 36-63 | Reserved | |

It should be noted that in the foregoing embodiment, the indication field is used to jointly indicate a resource block grid offset and a frequency location of the SSB, but the indication field is unnecessarily understood in such a manner. In different cases, functions and understandings of the indication field may be different. For example, when a channel raster value is 100 KHz, a function of the indication field may be the same as that described in the foregoing embodiment. When a channel raster value is 15 KHz, a function of the indication field may be only used to indicate a resource block grid offset. Alternatively, it may be understood that the frequency location of the SSB that is indicated by the indication field is a unique location, for example, the first frequency. In other words, when the channel raster value is 15 KHz, the frequency location of the SSB is only N×900 KHz. Other cases are by analogy with the foregoing. When the channel raster value changes again, the function of the indication field may also change accordingly. This is not limited in this embodiment of this application. Functions of the indication field corresponding to different channel raster values all fall within the protection scope of this embodiment of this application.

After determining the frequency of the first subcarrier, the terminal device can adjust a frequency of the terminal device based on the frequency of the first subcarrier. This helps improve precision of adjusting the frequency by the terminal device, and reduce a frequency offset between the terminal device and the network device. In addition, in this embodiment of this application, the existing field in the PBCH is used as the first indication information, and there is no need to specially use another field as the first indication information. This can effectively reduce transmission resources used, and improve information utilization.

Figure 7:
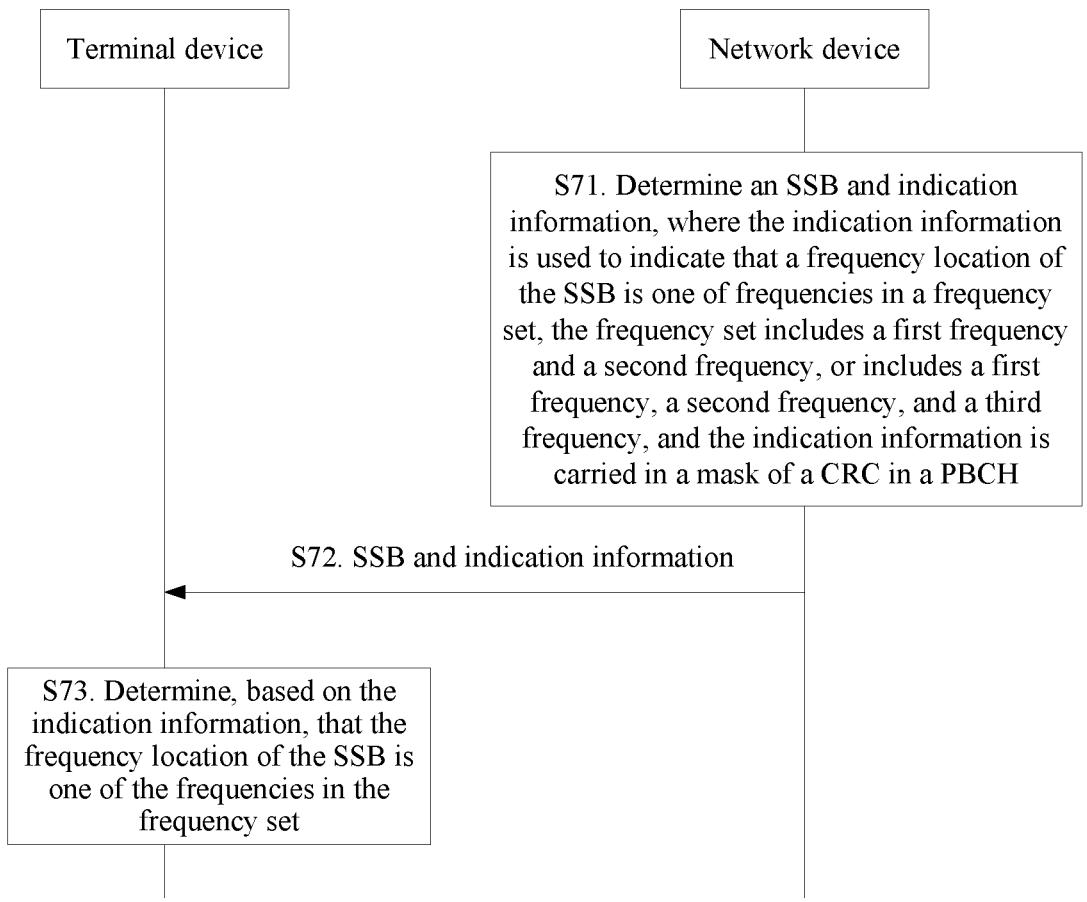
FIG. 7 is a flowchart of a third signal sending and receiving method according to an embodiment of this application.

To improve accuracy of adjusting a frequency offset by a terminal device, an embodiment of this application provides a third signal sending and receiving method below, as shown in FIG. 7. In the following description process, an example in which the method is applied to the application scenario shown in FIG. 3 is used. A procedure of the method is described as follows:

S71. A network device determines an SSB and indication information, where the indication information is used to indicate that a frequency location of the SSB is one of frequencies in a frequency set, the frequency set includes a first frequency and a second frequency, or includes a first frequency, a second frequency, and a third frequency, and the indication information is carried in a mask of a cyclic redundancy code (CRC) in a PBCH.

S72. The network device sends the SSB and the indication information to a terminal device, and the terminal device receives the SSB and the indication information.

S73. The terminal device determines, based on the indication information, that the frequency location of the SSB is one of the frequencies in the frequency set.

For descriptions of some concepts such as the frequency location of the SSB, the frequency set, the first frequency, the second frequency, and the third frequency, refer to the embodiment shown in FIG. 4. Details are not described again. It should be understood that in this embodiment of this application, the frequency location of the SSB may be a location of a first subcarrier in the SSB. For a description of the first subcarrier, refer to the embodiment shown in FIG. 4. Details are not described again.

In this embodiment of this application, the indication information indicates that a frequency of the first subcarrier in the SSB is one of the frequencies in the frequency set. Specifically, the indication information may give an indication as a whole, or may give an indication in a level-based indication manner. It can be learned that regardless of whether the indication information gives an indication as a whole, or gives an indication in a level-based indication manner, the indication information may directly indicate that the frequency of the first subcarrier is one of the frequencies in the frequency set, or may indirectly indicate that the frequency of the first subcarrier is one of the frequencies in the frequency set. Therefore, in the following description, the indication information may directly or indirectly indicate that the frequency of the first subcarrier is one of the frequencies in the frequency set. Details are not repeated below. The following separately describes a case of giving an indication as a whole and a case of giving an indication in a level-based indication manner.

III. Indication as a Whole

In this indication manner, the indication information gives an indication as a whole.

In this embodiment of this application, the indication information is carried in the mask of the CRC in the PBCH, and it may be considered that the indication information is implemented by using the mask of the CRC in the PBCH. Therefore, it may be considered that this indication manner is an implicit indication manner. For example, a plurality of masks may be set for the CRC in the PBCH by using a protocol, a quantity of specified masks is equal to, for example, a quantity of frequencies included in the frequency set, and the masks may be in a one-to-one correspondence with the frequencies in the frequency set. An example in which the frequency set includes the first frequency, the second frequency, and the third frequency is used. For example, three masks are set for the CRC in the PBCH: a first mask, a second mask, and a third mask. The first mask is corresponding to the first frequency, the second mask is corresponding to the second frequency, and the third mask is corresponding to the third frequency. Therefore, the network device may indicate the frequency of the first subcarrier by using the mask of the CRC in the PBCH. After receiving the SSB, the terminal device may separately check the CRC based on the three masks when demodulating the PBCH. A frequency corresponding to a mask with which the check succeeds is the frequency of the first subcarrier. For example, when a length of the CRC is 24, a correspondence between a frequency corresponding to a raster location of the SSB and a mask of the CRC in the PBCH may be listed in Table 3.

TABLE 3

| Frequency (KHz) corresponding to the raster location of the SSB | Mask of the CRC in the PBCH |
|---|---|
| N × 900 | <0, 0, 0, 0, 0, 0, 0, 0, 0, 0, 0, 0, 0, 0, 0, 0, 0, 0, 0, 0, 0, 0, 0, 0> |
| N × 900 + 5 | <1, 1, 1, 1, 1, 1, 1, 1, 1, 1, 1, 1, 1, 1, 1, 1, 1, 1, 1, 1, 1, 1, 1, 1> |
| N × 900 − 5 | <0, 1, 0, 1, 0, 1, 0, 1, 0, 1, 0, 1, 0, 1, 0, 1, 0, 1, 0, 1,0, 1> |

An example in which the first frequency is equal to N×900 KHz, the second frequency is equal to (N×900+5) KHz, and the third frequency is equal to (N×900−5) KHz is used in Table 3. For example, <0, 0, 0, 0, 0, 0, 0, 0, 0, 0, 0, 0, 0, 0, 0, 0, 0, 0, 0, 0, 0, 0, 0, 0> is the first mask, <1, 1, 1, 1, 1, 1, 1, 1, 1, 1, 1, 1, 1, 1, 1, 1, 1, 1, 1, 1, 1, 1, 1, 1> is the second mask, and <0, 1, 0, 1, 0, 1, 0, 1, 0, 1, 0, 1, 0, 1, 0, 1, 0, 1, 0, 1, 0, 1> is the third mask. In addition, an example in which a frequency is directly indicated is used in Table 3.

It should be noted that Table 3 is only an example, and a correspondence between a value of the mask of the CRC in the PBCH and a frequency is not limited to the cases listed in Table 3. In addition, a length of the mask of the CRC in the PBCH and the length of the CRC may be the same as or different from those listed in Table 3. For example, the length of the CRC is 24, and the length of the mask of the CRC may be a value less than 24, such as 1, 2, or 12. This is not limited herein.

IV. Level-Based Indication

In this indication manner, the indication information gives a level-based indication.

In a first example of the level-based indication, the indication information may include first indication information and second indication information.

The first indication information is used to indicate that the frequency of the first subcarrier is the first frequency or a fourth frequency, and the fourth frequency is the second frequency or the third frequency. Therefore, if the first indication information indicates that the frequency of the first subcarrier is the first frequency, the terminal device can directly determine, based on the first indication information, that the frequency of the first subcarrier is the first frequency. If the first indication information indicates that the frequency of the first subcarrier is the fourth frequency, the terminal device further needs to determine whether the frequency of the first subcarrier is the second frequency or the third frequency. In this case, the terminal device may further perform determining by using the second indication information. When the first indication information indicates that the frequency of the first subcarrier is the fourth frequency, the second indication information is used to indicate that the frequency of the first subcarrier is the second frequency or the third frequency. In this way, the terminal device can determine the frequency of the first subcarrier by using the first indication information and the second indication information.

For example, the first indication information may be carried in the mask of the CRC in the PBCH in the SSB, and the second indication information may be a fifth field in the PBCH in the SSB or a sixth field in RMSI.

For example, a plurality of masks may be set for the CRC in the PBCH by using a protocol, and the specified masks include, for example, a first scrambling mask and a second mask. It is stipulated that if the first mask is used for the CRC in the PBCH, it indicates that the frequency of the first subcarrier is the first frequency; or if the second mask is used for the CRC in the PBCH, it indicates that the frequency of the first subcarrier is the fourth frequency. Then, after receiving the PBCH, if the terminal device determines that the mask used for the CRC in the PBCH is the first mask, the terminal device can determine that the frequency of the first subcarrier is the first frequency. In this case, the terminal device can determine, based on the first indication information without using the second indication information, that the frequency of the first subcarrier is the first frequency. Alternatively, if determining that the mask used for the CRC in the PBCH is the second mask, the terminal device can determine that the frequency of the first subcarrier is the fourth frequency. In this case, the terminal device further needs to determine the frequency of the first subcarrier by using the second indication information. For example, the second indication information occupies one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between a mask and a state indicated by the mask, and there may also be another correspondence between a value of the bit of the second indication information and a state indicated by the value. This is only an example, but does not constitute any limitation.

This implementation may be understood as an implicit indication manner. Alternatively, in consideration of the second indication information, this implementation may be understood as an indication manner combining an explicit indication and an implicit indication.

In a second example of the level-based indication, the indication information may include first indication information, or the indication information may include first indication information and second indication information. In this embodiment, whether the indication information includes the second indication information depends on a situation.

The first indication information is used to indicate that the frequency of the first subcarrier is the first frequency or a fourth frequency, and the fourth frequency is the second frequency or the third frequency. Therefore, if the first indication information indicates that the frequency of the first subcarrier is the first frequency, the terminal device can directly determine, based on the first indication information, that the frequency of the first subcarrier is the first frequency. In this case, the indication information does not need to include the second indication information. In other words, the network device does not need to send the second indication information. If the first indication information indicates that the frequency of the first subcarrier is the fourth frequency, the terminal device further needs to determine whether the frequency of the first subcarrier is the second frequency or the third frequency. In this case, the indication information further includes the second indication information. In other words, the network device further needs to send the second indication information, and the terminal device can further determine the frequency of the first subcarrier by using the second indication information. When the first indication information indicates that the frequency of the first subcarrier is the fourth frequency, the second indication information is used to indicate that the frequency of the first subcarrier is the second frequency or the third frequency. In this way, the terminal device can determine the frequency of the first subcarrier by using the first indication information or by using the first indication information and the second indication information.

For example, the first indication information may be carried in the mask of the CRC in the PBCH in the SSB.

For example, a plurality of masks may be set for the CRC in the PBCH by using a protocol, and the specified masks include, for example, a first scrambling mask and a second mask. It is stipulated that if the first mask is used for the CRC in the PBCH, it indicates that the frequency of the first subcarrier is the first frequency; or if the second mask is used for the CRC in the PBCH, it indicates that the frequency of the first subcarrier is the fourth frequency. Then, after receiving the PBCH, if the terminal device determines that the mask used for the CRC in the PBCH is the first mask, the terminal device can determine that the frequency of the first subcarrier is the first frequency. In this case, the terminal device can determine, based on the first indication information without using the second indication information, that the frequency of the first subcarrier is the first frequency, and the network device does not need to send the second indication information. In other words, the indication information includes only the first indication information in this case. Alternatively, if determining that the mask used for the CRC in the PBCH is the second mask, the terminal device can determine that the frequency of the first subcarrier is the fourth frequency. In this case, the terminal device further needs to determine the frequency of the first subcarrier by using the second indication information; and the network device further needs to send the second indication information in addition to the first indication information. In other words, the indication information includes the first indication information and the second indication information in this case. For example, the second indication information is a fifth field in the PBCH in the SSB or a sixth field in RMSI. The second indication information occupies, for example, one bit, and if a value of the bit of the second indication information is 0, it indicates that the frequency of the first subcarrier is the second frequency; or if a value of the bit of the second indication information is 1, it indicates that the frequency of the first subcarrier is the third frequency. It should be noted that there may be another correspondence between a mask and a state indicated by the mask, and there may also be another correspondence between a value of the bit of the second indication information and a state indicated by the value. This is only an example, but does not constitute any limitation.

This implementation may be understood as an implicit indication manner. Alternatively, in consideration of the second indication information, this implementation may be understood as an indication manner combining an explicit indication and an implicit indication.

In this embodiment of this application, the frequency of the first subcarrier can be determined by using the mask, to reduce an amount of information that needs to be specially used as the indication information. This helps reduce transmission resources used, and improve information utilization. In addition, the network device may indicate the frequency of the first subcarrier. This helps improve precision of adjusting a frequency by the terminal device, and reduce a frequency offset between the terminal device and the network device.

Figure 8:
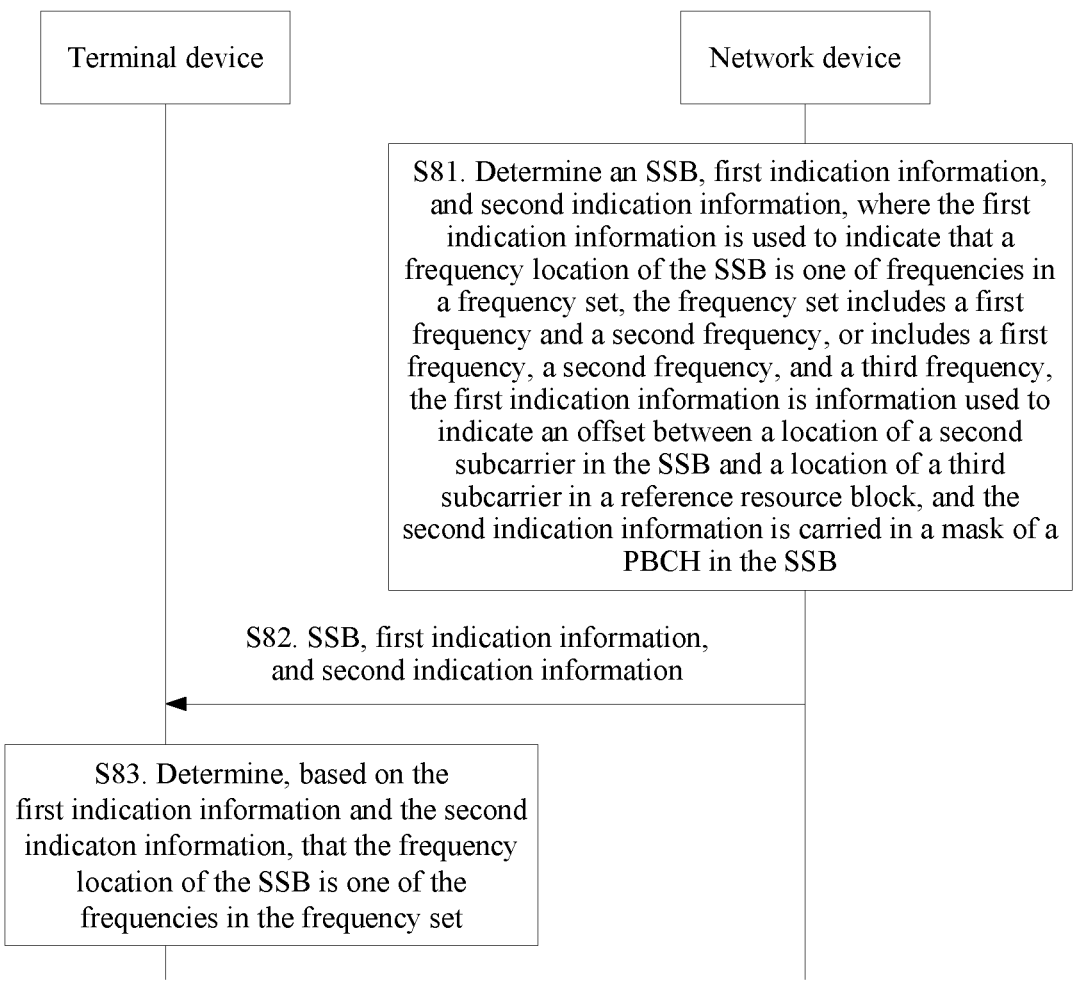
FIG. 8 is a flowchart of a fourth signal sending and receiving method according to an embodiment of this application.

To improve accuracy of adjusting a frequency offset by a terminal device, an embodiment of this application provides a fourth signal sending and receiving method below, as shown in FIG. 8. In the following description process, an example in which the method is applied to the application scenario shown in FIG. 3 is used. A procedure of the method is described as follows:

S81. A network device determines an SSB, first indication information, and second indication information, where the first indication information is used to indicate that a frequency location of the SSB is one of frequencies in a frequency set, the frequency set includes a first frequency and a second frequency, or includes a first frequency, a second frequency, and a third frequency, the first indication information is information used to indicate an offset between a location of a second subcarrier in the SSB and a location of a third subcarrier in a reference resource block, and the second indication information is carried in a mask of a PBCH in the SSB.

S82. The network device sends the SSB, the first indication information, and the second indication information to a terminal device, and the terminal device receives the SSB, the first indication information, and the second indication information.

S83. Determine, based on the first indication information and the second indication information, that the frequency location of the SSB is one of the frequencies in the frequency set.

For descriptions of some concepts such as the frequency location of the SSB, the frequency set, the first frequency, the second frequency, and the third frequency, refer to the embodiment shown in FIG. 4. Details are not described again. It should be understood that in this embodiment of this application, the frequency location of the SSB may be a location of a first subcarrier in the SSB. For a description of the first subcarrier, refer to the embodiment shown in FIG. 4. Details are not described again.

In this embodiment of this application, the first indication information is, for example, a first field in a PBCH in the SSB, and the first field in the PBCH may be a field used to indicate an offset between a location of a second subcarrier in the SSB and a location of a third subcarrier in a reference resource block. It may be understood that the first field in the PBCH and the foregoing third field, the foregoing seventh field, or the foregoing eighth field in the PBCH are a same field. Therefore, for a description of the first field in the PBCH, refer to the related description in the embodiment shown in FIG. 4. Details are not described again. It may be understood that when a value indicated by the first field is an even number, it implicitly indicates that a raster location of the SSB is the first frequency; or when a value indicated by the first field is an odd number, it implicitly indicates that a raster location of the SSB is the second frequency or the third frequency. Therefore, the network device may indicate the raster location of the SSB by using the first field.

When the first indication information indicates that a frequency of the first subcarrier is a fourth frequency, the terminal device further determines, based on the second indication information, that the frequency of the first subcarrier in the SSB is one of the frequencies in the frequency set. Alternatively, when the first indication information indicates that a frequency of the first subcarrier is the first frequency, the terminal device determines, based on the first indication information, that the frequency of the first subcarrier is the first frequency in the frequency set. The fourth frequency is the second frequency or the third frequency.

Specifically, if the value indicated by the first field is an odd number, it implicitly indicates that the raster location of the SSB is the second frequency or the third frequency. In this case, the terminal device can further determine the frequency of the first subcarrier finally by using the second indication information. In this embodiment of this application, the second indication information may be carried in the mask of the PBCH in the SSB, and it may be considered that the second indication information is implemented by using a mask of a CRC in the PBCH. For example, a plurality of masks may be set for the CRC in the PBCH by using a protocol. For example, two masks are set: a first mask and a second mask. The first mask is corresponding to the first frequency, and the second mask is corresponding to the fourth frequency. In other words, if the first mask is used for the CRC in the PBCH, it implicitly indicates that the frequency of the first subcarrier is the first frequency; or if the second mask is used for the CRC in the PBCH, it implicitly indicates that the frequency of the first subcarrier is the fourth frequency. Referring to Table 4, an example in which the first frequency is equal to N×900 KHz, the second frequency is equal to (N×900+5) KHz, and the third frequency is equal to (N×900−5) KHz is used. For example, <0, 0, 0, 0, 0, 0, 0, 0, 0, 0, 0, 0, 0, 0, 0, 0, 0, 0, 0, 0, 0, 0, 0> is the first mask, and <1, 1, 1, 1, 1, 1, 1, 1, 1, 1, 1, 1, 1, 1, 1, 1, 1, 1, 1, 1, 1, 1, 1> is the second mask. In addition, an example in which a frequency is directly indicated is used in Table 4. Therefore, if the value indicated by the first field is an odd number, the network device may further indicate the frequency of the first subcarrier by using the mask of the CRC in the PBCH. After receiving the SSB, the terminal device may separately check the CRC based on the two masks when demodulating the PBCH. If the value indicated by the first field is an odd number, a frequency corresponding to a mask with which the check succeeds is the frequency of the first subcarrier.

TABLE 4

| Frequency (KHz) corresponding to the raster location of the SSB | Mask of the CRC in the PBCH |
|---|---|
| N × 900 + 5 | <0, 0, 0, 0, 0, 0, 0, 0, 0, 0, 0, 0, 0, 0, 0, 0, 0, 0, 0, 0, 0, 0, 0, 0> |
| N × 900 − 5 | <1, 1, 1, 1, 1, 1, 1, 1, 1, 1, 1, 1, 1, 1, 1, 1, 1, 1, 1, 1, 1, 1, 1, 1> |

It should be noted that Table 4 is only an example, and a correspondence between a value of the mask of the CRC in the PBCH and a frequency is not limited to the cases listed in Table 4.

If the value indicated by the first field is an even number, it implicitly indicates that the raster location of the SSB is the first frequency, and the terminal device can directly determine, based on the first indication information without using the second indication information, that the frequency of the first subcarrier is the first frequency. In this case, the first mask or the second mask may be used for the PBCH, and a specific mask to be used may be stipulated by a protocol. For example, the first mask or the second mask is set as a default mask in the protocol. If the value indicated by the first field is an even number, the mask of the PBCH is the default mask.

In this embodiment of this application, the frequency of the first subcarrier can be determined by using the existing field in the PBCH or by using the existing field in the PBCH and the existing mask of the PBCH, and there is no need to specially use other information as the indication information. This helps reduce transmission resources used, and improve information utilization. In addition, the network device may indicate the frequency of the first subcarrier. This helps improve precision of adjusting a frequency by the terminal device, and reduce a frequency offset between the terminal device and the network device.

Figure 9:
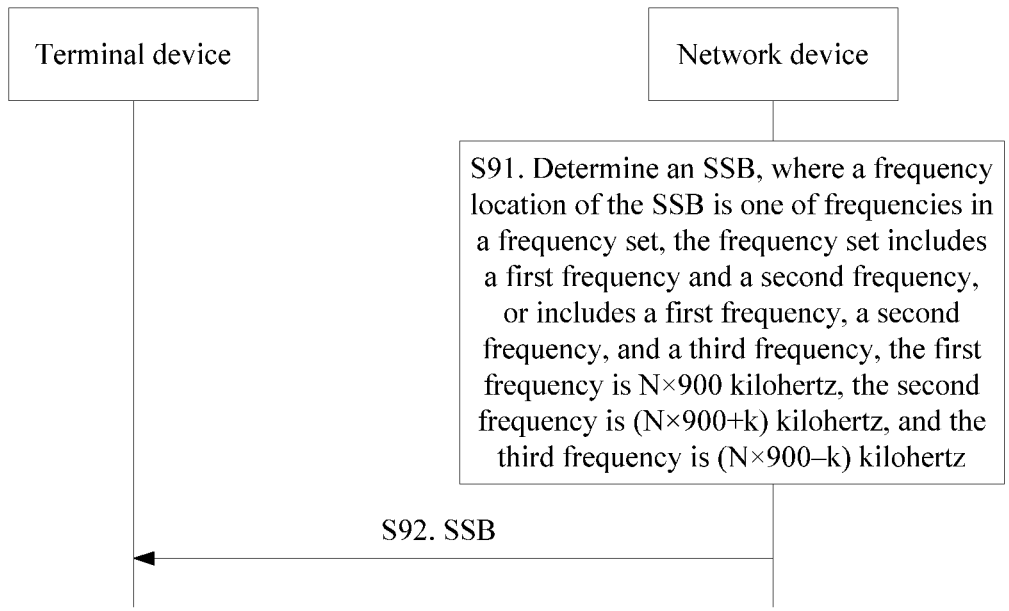
FIG. 9 is a flowchart of a fifth signal sending and receiving method according to an embodiment of this application.

To improve accuracy of adjusting a frequency offset by a terminal device, an embodiment of this application provides a fifth signal sending and receiving method, as shown in FIG. 9. In the following description process, an example in which the method is applied to the application scenario shown in FIG. 3 is used. A procedure of the method is described as follows:

S91. A network device determines an SSB, where a frequency location of the SSB is one of frequencies in a frequency set, the frequency set includes a first frequency and a second frequency, or includes a first frequency, a second frequency, and a third frequency, the first frequency is N×900 kilohertz, the second frequency is (N×900+k) kilohertz, and the third frequency is (N×900−k) kilohertz, where N is a positive integer.

S92. The network device sends the SSB to a terminal device, and the terminal device receives the SSB.

For descriptions of some concepts such as the frequency location of the SSB and the frequency set, refer to the embodiment shown in FIG. 4. Details are not described again. It should be understood that in this embodiment of this application, the frequency location of the SSB may be a location of a first subcarrier in the SSB. For a description of the first subcarrier, refer to the embodiment shown in FIG. 4. Details are not described again.

In an example, k is equal to M×10, where M is a positive integer. For example, M may be 1 or 2. For another example, M is not equal to 10. In an example, k is equal to 10. Certainly, k may alternatively be another value. A value of k is not limited in this embodiment of this application. For example, k is equal to 5, 10, or 20, or k has another value. Using the first frequency as a reference, the second frequency is unnecessarily symmetrical with the third frequency herein. In other words, an absolute value of a difference between the second frequency and the first frequency is unnecessarily equal to an absolute value of a difference between the third frequency and the first frequency. Therefore, the first frequency may be equal to N×900 KHz, the second frequency may be equal to (N×900+k1) KHz, and the third frequency may be equal to (N×900−k2) KHz, where k1 and k2 are not equal. For example, k1 is equal to 5, and k2 is equal to 10. Certainly, k1 and k2 may alternatively be other values. After receiving the SSB, the terminal device can determine whether the frequency location of the SSB is the first frequency, the second frequency, or the third frequency, so as to adjust a frequency of the terminal device based on the frequency location of the SSB.

Alternatively, k is equal to 10. In the prior art, k is equal to 5. When a channel raster value is 100 KHz, some limitations are imposed on a location of a center frequency of a carrier. For example, in a case of the channel raster value of 100 KHz, if a value of the center frequency of the carrier is 700 MHz, when both a subcarrier spacing of the SSB and a subcarrier spacing of a system resource block are 30 KHz, to ensure that a subcarrier in the SSB is aligned with a subcarrier in the system resource block, no available synchronous raster frequency can be found for SSB transmission according to a synchronous raster rule of the SSB, that is, N×900 kilohertz, (N×900+5) kilohertz, and (N×900−5) kilohertz. Therefore, in this embodiment, the raster rule of the SSB is modified into N×900 kilohertz, (N×900+10) kilohertz, and (N×900−10) kilohertz, that is, k is equal to 10. In this way, a problem that occurs when k is equal to 5 can be resolved.

Alternatively, k is equal to 20. Similarly, in this embodiment, the raster rule of the SSB is modified into N×900 kilohertz, (N×900+20) kilohertz, and (N×900-20) kilohertz, that is, k is equal to 20. In this way, a problem that occurs when k is equal to 5 can be resolved.

Alternatively, k is equal to 50. Similarly, in this embodiment, the raster rule of the SSB is modified into N×900 kilohertz, (N×900+50) kilohertz, and (N×900-50) kilohertz. In this way, a problem that occurs when k is equal to 5 can be resolved. Optionally, when k is equal to 50, the terminal device is unlikely to confuse different frequencies satisfying the synchronous raster rule. In this case, the network device does not need to send the indication information to the terminal device, and the terminal device can still determine a detected frequency of a synchronous raster relatively accurately. Certainly, the network device may alternatively send the indication information to the terminal device, to ensure to greatest extent that the terminal device accurately determines a detected frequency of a synchronous raster.

In an example, k is equal to M×10, where M is a positive integer, k is not equal to X×30, and X is a positive integer. In other words, a value of k may be a multiple of 10, but cannot be a multiple of 30. In this way, a problem similar to the problem that occurs when k is equal to 5 can be avoided. Optionally, k is not equal to 100. For example, the value of k may be one of 10, 20, 40, 50, 70, 80, 110, 130, 140, 160, 170, 190, 200, 220, 230, 250, 260, 280, 290, 310, 320, 340, 350, 370, 380, 400, 410, 430, and 440. For another example, when there are k1 and k2, values of k1 and k2 each are one of 10, 20, 40, 50, 70, 80, 110, 130, 140, 160, 170, 190, 200, 220, 230, 250, 260, 280, 290, 310, 320, 340, 350, 370, 380, 400, 410, 430, and 440.

In an example, the raster rule of the SSB may be modified into N×900 kilohertz, (N×900+k) kilohertz, (N×900−k) kilohertz, (N×900+g) kilohertz, and (N×900−g) kilohertz, where k is not equal to g. Optionally, k is equal to M×5, where M is a positive integer, g is equal to X×10, and X is a positive integer. For example, a value of k is one of 5, 10, 15, 20, 25, 30, 35, . . . , and 445, and a value of g is one of 10, 20, 30, 40, 50, 60, . . . , and 440. Optionally, k is equal to M×5, where M is a positive integer, and g is equal to X×10 but is not equal to Y×30, where both X and Y are positive integers. For example, a value of k may be one of 5, 10, 15, 20, 25, 30, 35, . . . , and 445, and a value of g is one of 10, 20, 40, 50, 70, 80, 100, 110, 130, 140, 160, 170, 190, 200, 220, 230, 250, 260, 280, 290, 310, 320, 340, 350, 370, 380, 400, 410, 430, and 440. Certainly, there may be an opposite case. To be specific, k is equal to X×10, where X is a positive integer; and g is equal to M×5, where M is a positive integer. This is not limited herein.

In addition, similar to the foregoing embodiment, the first frequency is not limited to N×900 KHz, and may be N×600 KHz or N×300 KHz, or certainly may be another value. This is not limited herein. It should be noted that a first frequency defined in an existing wireless communications system is N×900 KHz. With evolution of the system, a value of the first frequency may change. Similarly, the second frequency and the third frequency are not limited in this embodiment of this application either. For example, when the first frequency is N×600 KHz, the second frequency may be (N×600+k) KHz, and the third frequency may be (N×600−k) KHz. It may be understood that the first frequency is equal to (N×P) KHz, the second frequency is equal to (N×P+k) KHz, and the third frequency is equal to (N×P−k) KHz, where P may be equal to goo, or may be another value such as 600 or 300. This is not limited in this embodiment of this application.

In this embodiment of this application, the network device may directly send the SSB to the terminal device. If the value of k is relatively large, a difference between adjacent frequencies satisfying the synchronous raster rule is also relatively large, and the terminal device is unlikely to confuse different frequencies satisfying the synchronous raster rule. Therefore, the terminal device can still determine a detected frequency of a synchronous raster relatively accurately, without using the indication information, so as to adjust a frequency of the terminal device relatively accurately, thereby improving precision of adjusting the frequency by the terminal device, and reducing a frequency offset between the terminal device and the network device.

With reference to the accompanying drawings, the following describes devices provided in the embodiments of this application.

Figure 10:
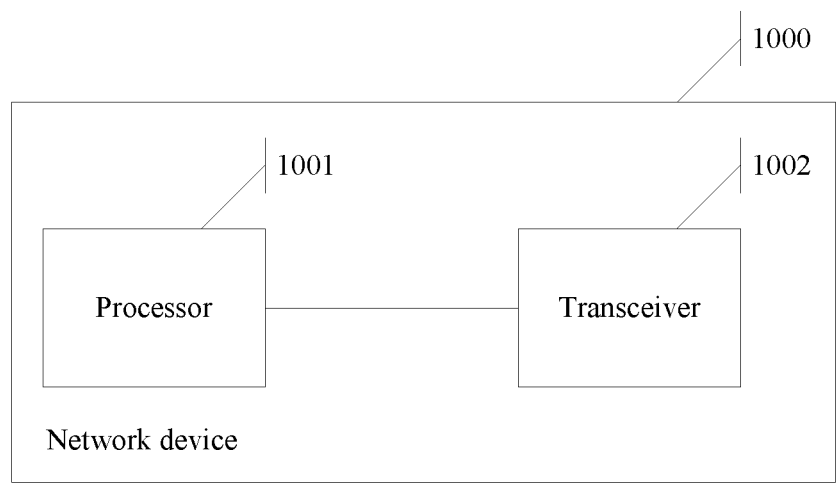
FIG. 10 is a schematic structural diagram of a network device according to an embodiment of this application.

FIG. 10 is a schematic structural diagram of a network device 1000. The network device 1000 may implement functions of the network device described above. The network device 1000 may be the network device described above, or may be a chip disposed in the network device described above. The network device 1000 may include a processor 1001 and a transceiver 1002. The processor 1001 may be configured to perform S41 in the embodiment shown in FIG. 4, S61 in the embodiment shown in FIG. 6, S71 in the embodiment shown in FIG. 7, and S81 in the embodiment shown in FIG. 8, and may further be configured to perform S91 in the embodiment shown in FIG. 9 and/or another process used to support the technology described in this specification. The transceiver 1002 may be configured to perform S42 in the embodiment shown in FIG. 4, S62 in the embodiment shown in FIG. 6, S72 in the embodiment shown in FIG. 7, and S82 in the embodiment shown in FIG. 8, and may further be configured to perform S92 in the embodiment shown in FIG. 9 and/or another process used to support the technology described in this specification.

For example, the processor 1001 is configured to determine an SSB and indication information, where the indication information is used to indicate that a frequency location of the SSB is one of frequencies in a frequency set, and the frequency set includes a first frequency and a second frequency, or includes a first frequency, a second frequency, and a third frequency.

The transceiver 1002 is configured to send the SSB and the indication information to a terminal device.

All related content of the steps in the foregoing method embodiments may be cited in function descriptions of corresponding function modules. Details are not described herein again.

Figure 11:
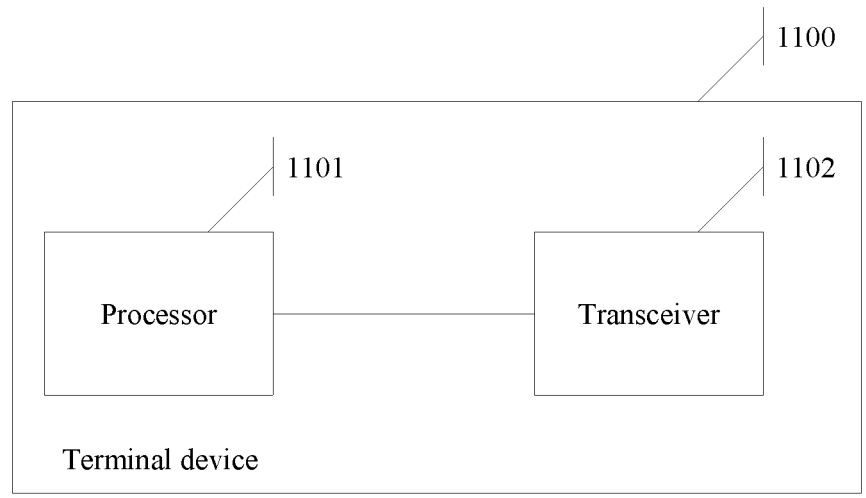
FIG. 11 is a schematic structural diagram of a terminal device according to an embodiment of this application.

FIG. 11 is a schematic structural diagram of a terminal device 1100. The terminal device 1100 may implement functions of the terminal device described above. The terminal device 1100 may be the terminal device described above, or may be a chip disposed in the terminal device described above. The terminal device 1100 may include a processor 1101 and a transceiver 1102. The processor 1101 may be configured to perform S43 in the embodiment shown in FIG. 4, S63 in the embodiment shown in FIG. 6, S73 in the embodiment shown in FIG. 7, and S83 in the embodiment shown in FIG. 8, and may further be configured to perform the step of determining a frequency location of a received SSB based on the SSB in the embodiment shown in FIG. 9 and/or another process used to support the technology described in this specification. The transceiver 1102 may be configured to perform S42 in the embodiment shown in FIG. 4, S62 in the embodiment shown in FIG. 6, S72 in the embodiment shown in FIG. 7, and S82 in the embodiment shown in FIG. 8, and may further be configured to perform S92 in the embodiment shown in FIG. 9 and/or another process used to support the technology described in this specification.

For example, the transceiver 1102 is configured to receive an SSB and indication information from a network device.

The processor 1101 is configured to determine, based on the indication information, that a frequency location of the SSB is one of frequencies in a frequency set, where the frequency set includes a first frequency and a second frequency, or includes a first frequency, a second frequency, and a third frequency.

All related content of the steps in the foregoing method embodiments may be cited in function descriptions of corresponding function modules. Details are not described herein again.

Figure 12A:
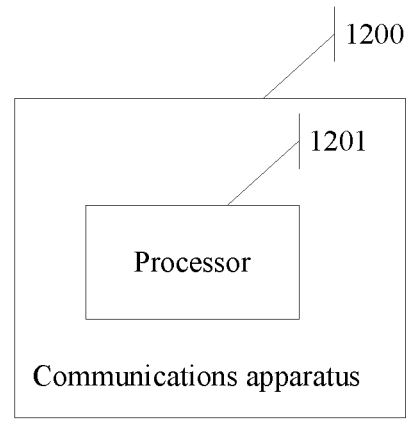
FIG. 12A and FIG. 12B are two schematic structural diagrams of a communications apparatus according to an embodiment of this application.

In a simple embodiment, a person skilled in the art may be aware that the network device 1000 or the terminal device 1100 may be implemented by using a structure of a communications apparatus 1200 shown in FIG. 12A. The communications apparatus 1200 may implement functions of the network device or the terminal device described above. The communications apparatus 1200 may include a processor 1201. When the communications apparatus 1200 is configured to implement the functions of the network device in the embodiment shown in FIG. 4, the processor 1201 may be configured to perform S41 in the embodiment shown in FIG. 4 and/or another process used to support the technology described in this specification. When the communications apparatus 1200 is configured to implement the functions of the network device in the embodiment shown in FIG. 6, the processor 1201 may be configured to perform S61 in the embodiment shown in FIG. 6 and/or another process used to support the technology described in this specification. When the communications apparatus 1200 is configured to implement the functions of the network device in the embodiment shown in FIG. 7, the processor 1201 may be configured to perform S71 in the embodiment shown in FIG. 7 and/or another process used to support the technology described in this specification. When the communications apparatus 1200 is configured to implement the functions of the network device in the embodiment shown in FIG. 8, the processor 1201 may be configured to perform S81 in the embodiment shown in FIG. 8 and/or another process used to support the technology described in this specification. When the communications apparatus 1200 is configured to implement the functions of the network device in the embodiment shown in FIG. 9, the processor 1201 may be configured to perform S91 in the embodiment shown in FIG. 9 and/or another process used to support the technology described in this specification. When the communications apparatus 1200 is configured to implement the functions of the terminal device in the embodiment shown in FIG. 4, the processor 1201 may be configured to perform S43 in the embodiment shown in FIG. 4 and/or another process used to support the technology described in this specification. When the communications apparatus 1200 is configured to implement the functions of the terminal device in the embodiment shown in FIG. 6, the processor 1201 may be configured to perform S63 in the embodiment shown in FIG. 6 and/or another process used to support the technology described in this specification. When the communications apparatus 1200 is configured to implement the functions of the terminal device in the embodiment shown in FIG. 7, the processor 1201 may be configured to perform S73 in the embodiment shown in FIG. 7 and/or another process used to support the technology described in this specification. When the communications apparatus 1200 is configured to implement the functions of the terminal device in the embodiment shown in FIG. 8, the processor 1201 may be configured to perform S83 in the embodiment shown in FIG. 8 and/or another process used to support the technology described in this specification. When the communications apparatus 1200 is configured to implement the functions of the terminal device in the embodiment shown in FIG. 9, the processor 1201 may be configured to perform the step of determining a frequency location of a received SSB based on the SSB in the embodiment shown in FIG. 9 and/or another process used to support the technology described in this specification.

The communications apparatus 1200 may be implemented by using a field-programmable gate array (FPGA), an application-specific integrated circuit (ASIC), a system on chip (SoC), a central processing unit (CPU), a network processor (NP), a digital signal processor (DSP), a micro controller unit (MCU), a programmable controller (PLD), or another integrated chip. The communications apparatus 1200 may be disposed in the network device or the terminal device in the embodiments of this application, so that the network device or the terminal device implements a message transmission method provided in the embodiments of this application.

In an optional implementation, the communications apparatus 1200 may include a transceiver component, configured to communicate with the network device. For example, when the communications apparatus 1200 is configured to implement the functions of the network device or the terminal device in the embodiment shown in FIG. 4, the transceiver component may be configured to perform S42 in the embodiment shown in FIG. 4 and/or another process used to support the technology described in this specification. When the communications apparatus 1200 is configured to implement the functions of the network device or the terminal device in the embodiment shown in FIG. 6, the transceiver component may be configured to perform S62 in the embodiment shown in FIG. 6 and/or another process used to support the technology described in this specification. When the communications apparatus 1200 is configured to implement the functions of the network device or the terminal device in the embodiment shown in FIG. 7, the transceiver component may be configured to perform S72 in the embodiment shown in FIG. 7 and/or another process used to support the technology described in this specification. When the communications apparatus 1200 is configured to implement the functions of the network device or the terminal device in the embodiment shown in FIG. 8, the transceiver component may be configured to perform S82 in the embodiment shown in FIG. 8 and/or another process used to support the technology described in this specification. When the communications apparatus 1200 is configured to implement the functions of the network device or the terminal device in the embodiment shown in FIG. 9, the transceiver component may be configured to perform S92 in the embodiment shown in FIG. 9 and/or another process used to support the technology described in this specification.

Figure 12B:
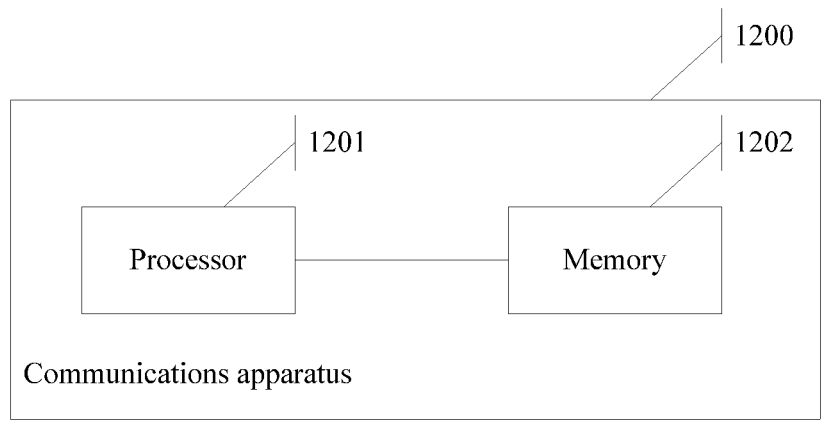

In an optional implementation, referring to FIG. 12B, the communications apparatus 1200 may further include a memory 1202. The memory 1202 is configured to store a computer program or an instruction, and the processor 1201 is configured to decode and execute the computer program or the instruction. It should be understood that the computer program or the instruction may include a function program of the network device or the terminal device. When the function program of the network device is decoded and executed by the processor 1201, the network device may be enabled to implement the functions of the network device in the signal sending method provided in the embodiment shown in FIG. 4, the embodiment shown in FIG. 6, the embodiment shown in FIG. 7, the embodiment shown in FIG. 8, or the embodiment shown in FIG. 9. When the function program of the terminal device is decoded and executed by the processor 1201, the terminal device may be enabled to implement the functions of the terminal device in the signal receiving method provided in the embodiment shown in FIG. 4, the embodiment shown in FIG. 6, the embodiment shown in FIG. 7, the embodiment shown in FIG. 8, or the embodiment shown in FIG. 9.

In another optional implementation, the function program of the network device or the terminal device is stored in an external memory of the communications apparatus 1200. When the function program of the network device is decoded and executed by the processor 1201, the memory 1202 temporarily stores some or all of content of the function program of the network device. When the function program of the terminal device is decoded and executed by the processor 1201, the memory 1202 temporarily stores some or all of content of the function program of the terminal device.

In another optional implementation, the function program of the network device or the terminal device is stored in an internal memory 1202 of the communications apparatus 1200. When the internal memory 1202 of the communications apparatus 1200 stores the function program of the network device, the communications apparatus 1200 may be disposed in the network device in the embodiments of this application. When the internal memory 1202 of the communications apparatus 1200 stores the function program of the terminal device, the communications apparatus 1200 may be disposed in the terminal device in the embodiments of this application.

In still another optional implementation, some content of the function program of the network device is stored in an external memory of the communications apparatus 1200, and the other content of the function program of the network device is stored in an internal memory 1202 of the communications apparatus 1200. Alternatively, some content of the function program of the terminal device is stored in an external memory of the communications apparatus 1200, and the other content of the function program of the terminal device is stored in an internal memory 1202 of the communications apparatus 1200.

In the embodiments of this application, function modules of the network device 1000, the terminal device 1100, and the communications apparatus 1200 are obtained through division in correspondence to the functions, or presented in an integrated form. The "module" herein may be an ASIC, a processor executing one or more software or firmware programs, a memory, an integrated logic circuit, and/or another component capable of providing the foregoing functions.

In addition, the network device 1000 provided in the embodiment shown in FIG. 10 may alternatively be implemented in another form. For example, the network device includes a processing module and a transceiver module. For example, the processing module may be implemented by using the processor 1001, and the transceiver module may be implemented by using the transceiver 1002. The processing module may be configured to perform S41 in the embodiment shown in FIG. 4, S61 in the embodiment shown in FIG. 6, S71 in the embodiment shown in FIG. 7, and S81 in the embodiment shown in FIG. 8, and may further be configured to perform S91 in the embodiment shown in FIG. 9 and/or another process used to support the technology described in this specification. The transceiver module may be configured to perform S42 in the embodiment shown in FIG. 4, S62 in the embodiment shown in FIG. 6, S72 in the embodiment shown in FIG. 7, and S82 in the embodiment shown in FIG. 8, and may further be configured to perform S92 in the embodiment shown in FIG. 9 and/or another process used to support the technology described in this specification.

For example, the processing module is configured to determine an SSB and indication information, where the indication information is used to indicate that a frequency location of the SSB is one of frequencies in a frequency set, and the frequency set includes a first frequency and a second frequency, or includes a first frequency, a second frequency, and a third frequency.

The transceiver module is configured to send the SSB and the indication information to a terminal device.

All related content of the steps in the foregoing method embodiments may be cited in function descriptions of corresponding function modules. Details are not described herein again.

The terminal device 1100 provided in the embodiment shown in FIG. 11 may alternatively be implemented in another form. For example, the terminal device includes a processing module and a transceiver module. For example, the processing module may be implemented by using the processor 1101, and the transceiver module may be implemented by using the transceiver 1102. The processing module may be configured to perform S43 in the embodiment shown in FIG. 4, S63 in the embodiment shown in FIG. 6, S73 in the embodiment shown in FIG. 7, and S83 in the embodiment shown in FIG. 8, and may further be configured to perform the step of determining a frequency location of a received SSB based on the SSB in the embodiment shown in FIG. 9 and/or another process used to support the technology described in this specification. The transceiver module may be configured to perform S42 in the embodiment shown in FIG. 4, S62 in the embodiment shown in FIG. 6, S72 in the embodiment shown in FIG. 7, and S82 in the embodiment shown in FIG. 8, and may further be configured to perform S92 in the embodiment shown in FIG. 9 and/or another process used to support the technology described in this specification.

For example, the transceiver module is configured to receive an SSB and indication information from a network device.

The processing module is configured to determine, based on the indication information, that a frequency location of the SSB is one of frequencies in a frequency set, where the frequency set includes a first frequency and a second frequency, or includes a first frequency, a second frequency, and a third frequency.

All related content of the steps in the foregoing method embodiments may be cited in function descriptions of corresponding function modules. Details are not described herein again.

The network device 1000, the terminal device 1100, and the communications apparatus 1200 that are provided in the embodiments of this application may be configured to perform the method provided in the embodiment shown in FIG. 4, the embodiment shown in FIG. 6, the embodiment shown in FIG. 7, the embodiment shown in FIG. 8, or the embodiment shown in FIG. 9. Therefore, for technical effects that can be achieved by the network device 1000, the terminal device 1100, and the communications apparatus 1200, refer to the foregoing method embodiments. Details are not described herein again.

The embodiments of this application are described with reference to the flowcharts and/or block diagrams of the method, the device, and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the processes or functions according to the embodiments of this application are all or partially generated. The computer may be a general-purpose computer, a dedicated computer, a computer network, or another programmable apparatus. The computer instruction may be stored in a computer readable storage medium or may be transmitted from one computer readable storage medium to another computer readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Obviously, a person skilled in the art can make various modifications and variations to the embodiments of this application without departing from the spirit and scope of this application. In this way, this application is intended to cover these modifications and variations provided that they fall within the scope defined by the following claims and their equivalent technologies of this application.

What is claimed is:

1. A method, comprising:
determining, by a network device, a synchronization signal/physical broadcast channel block (SSB), wherein a frequency location of the SSB is ((N×600)+k) kilohertz, N is a positive integer, and k is equal to 50 or 250; and
sending, by the network device, the SSB to a terminal device.

2. The method according to claim 1, wherein N is an odd number or an even number greater than zero (0).

3. The method according to claim 1, wherein N is an even number, the frequency location of the SSB is ((T×1200)+k) kilohertz, and T=N/2.

4. A method, comprising:
receiving, by a terminal device, a synchronization signal/physical broadcast channel block (SSB) from a network device, wherein a frequency location of the SSB is ((N×600)+k) kilohertz, N is a positive integer, and k is equal to 50 or 250.

5. The method according to claim 4, wherein N is an odd number or an even number greater than zero (0).

6. The method according to claim 5, wherein N is an even number, the frequency location of the SSB is ((T×1200)+k) kilohertz, and T=N/2.

7. An apparatus, comprising:
a transceiver;
a processor; and
a computer-readable storage medium storing a program to be executed by the processor, the program including instructions for:
determining a synchronization signal/physical broadcast channel block (SSB), wherein a frequency location of the SSB is ((N×600)+k) kilohertz, N is a positive integer, and k is equal to 50 or 250; and
wherein transceiver is configured to send the SSB to a terminal device.

8. The apparatus according to claim 7, wherein N is an odd number or an even number greater than zero (0).

9. The apparatus according to claim 8, wherein N is an even number, the frequency location of the SSB is ((T×1200)+k) kilohertz, and T=N/2.

10. The apparatus according to claim 7, wherein the apparatus is a network device or chip circuit on a network device.

11. An apparatus, comprising:
a transceiver;
a processor; and
a computer-readable storage medium storing a program to be executed by the processor, the program including instructions for:
receiving a synchronization signal/physical broadcast channel block (SSB) from a network device, wherein a frequency location of the SSB is ((N×600)+k) kilohertz, N is a positive integer, and k is equal to 50 or 250.

12. The apparatus according to claim 11, wherein N is an odd number or an even number greater than zero (0).

13. The apparatus according to claim 12, wherein N is an even number, the frequency location of the SSB is ((T×1200)+k) kilohertz, and T=N/2.

14. The apparatus according to claim 11, wherein the apparatus is a terminal device or chip circuit on a terminal device.

15. A non-transitory computer-readable medium having processor-executable instructions stored thereon, wherein the processor-executable instructions are executable to:
determine a synchronization signal/physical broadcast channel block (SSB), wherein a frequency location of the SSB is ((N×600)+k) kilohertz, N is a positive integer, and k is equal to 50 or 250; and
send the SSB to a terminal device.

16. The non-transitory computer-readable medium according to claim 15, wherein N is an odd number or an even number greater than zero (0).

17. The non-transitory computer-readable medium according to claim 15, wherein N is an even number, the frequency location of the SSB is ((T×1200)+k) kilohertz, and T=N/2.

18. A non-transitory computer-readable medium having processor-executable instructions stored thereon, wherein the processor-executable instructions are executable to:
receive a synchronization signal/physical broadcast channel block (SSB) from a network device, wherein a frequency location of the SSB is ((N×600)+k) kilohertz, N is a positive integer, and k is equal to 50 or 250.

19. The non-transitory computer-readable medium according to claim 18, wherein N is an odd number or an even number greater than zero (0).

20. The non-transitory computer-readable medium according to claim 19, wherein N is an even number, the frequency location of the SSB is ((T×1200)+k) kilohertz, and T=N/2.

* * * * *

UNITED STATES PATENT AND TRADEMARK OFFICE
CERTIFICATE OF CORRECTION

PATENT NO. : 11,452,053 B2
APPLICATION NO. : 16/903936
DATED : September 20, 2022
INVENTOR(S) : Zhiheng Guo et al.

It is certified that error appears in the above-identified patent and that said Letters Patent is hereby corrected as shown below:

In the Specification

In the Background, Column 2, Line 7; delete "goo" and insert --900--.

In the Background, Column 2, Line 11; delete "goo" and insert --900--.

In the Detailed Description of Illustrative Embodiments, Column 13, Line 15; delete "goo" and insert --900--.

In the Detailed Description of Illustrative Embodiments, Column 13, Line 61; delete "goo" and insert --900--.

In the Detailed Description of Illustrative Embodiments, Column 14, Line 9; delete "goo" and insert --900--.

In the Detailed Description of Illustrative Embodiments, Column 14, Line 12; delete "goo" and insert --900--.

In the Detailed Description of Illustrative Embodiments, Column 15, Line 56; delete "goo" and insert --900--.

In the Detailed Description of Illustrative Embodiments, Column 21, Line 47; delete "12" and insert --127--.

In the Detailed Description of Illustrative Embodiments, Column 49, Line 39; delete "goo" and insert --900--.

Signed and Sealed this
Eighteenth Day of October, 2022

*Katherine Kelly Vidal*
Katherine Kelly Vidal
*Director of the United States Patent and Trademark Office*